US012781473B2

(12) United States Patent
Ito et al.

(10) Patent No.: US 12,781,473 B2
(45) Date of Patent: Nov. 3, 2026

(54) WORKING MACHINE

(71) Applicant: Kubota Corporation, Osaka (JP)

(72) Inventors: Junki Ito, Sakai (JP); Daiki Tamba, Sakai (JP); Takuma Sai, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 143 days.

(21) Appl. No.: 18/885,836

(22) Filed: Sep. 16, 2024

(65) Prior Publication Data

US 2025/0003193 A1 Jan. 2, 2025

Related U.S. Application Data

(63) Continuation of application No. PCT/JP2023/011388, filed on Mar. 23, 2023.

(30) Foreign Application Priority Data

Apr. 1, 2022 (JP) ................................ 2022-061893

(51) Int. Cl.
*E02F 9/20* (2006.01)
*B60K 1/00* (2006.01)
(Continued)

(52) U.S. Cl.
CPC ............ *E02F 9/2095* (2013.01); *B60K 11/02* (2013.01); *E02F 9/0866* (2013.01);
(Continued)

(58) Field of Classification Search
None
See application file for complete search history.

(56) References Cited

U.S. PATENT DOCUMENTS

2022/0032733 A1* 2/2022 Spangler ............ F15B 21/0423
2022/0275601 A1 9/2022 Kunizawa et al.
(Continued)

FOREIGN PATENT DOCUMENTS

JP 2021080709 A 5/2021
WO 2021246110 A1 12/2021

OTHER PUBLICATIONS

International Search Report in PCT/JP2023/011388, mailed Apr. 25, 2023, 2 pages.

*Primary Examiner* — Lail A Kleinman
(74) *Attorney, Agent, or Firm* — Keating & Bennett, LLP

(57) ABSTRACT

A working machine includes an electric motor, a working device driven by power of the electric motor, an operation device to operate the working device, an operation locker switchable between an enabling position at which an operation of the working device by the operation device is enabled and a disabling position at which the operation is disabled, a cooler including an electric cooling fan, a temperature detector to detect a cooling target temperature, which is the temperature of a cooling target to be cooled by the cooler, and a controller to control a fan rotational speed, which is the rotational speed of the cooling fan, in accordance with the cooling target temperature detected by the temperature detector. The controller changes a characteristic of the fan rotational speed with respect to the cooling target temperature depending on whether the operation locker is in the enabling position or in the disabling position.

17 Claims, 12 Drawing Sheets

(51) Int. Cl.

| | |
|---|---|
| ***B60K 11/02*** | (2006.01) |
| ***E02F 9/08*** | (2006.01) |
| ***E02F 9/22*** | (2006.01) |
| ***E02F 9/26*** | (2006.01) |
| ***F15B 15/18*** | (2006.01) |
| ***F15B 19/00*** | (2006.01) |
| ***F15B 21/0423*** | (2019.01) |

(52) U.S. Cl.

CPC ............ *E02F 9/2004* (2013.01); *E02F 9/207* (2013.01); *E02F 9/2203* (2013.01); *E02F 9/226* (2013.01); *E02F 9/26* (2013.01); *F15B 15/18* (2013.01); *F15B 19/00* (2013.01); *F15B 21/0423* (2019.01); *B60K 2001/006* (2013.01); *E02F 9/2285* (2013.01); *E02F 9/2292* (2013.01)

(56) References Cited

U.S. PATENT DOCUMENTS

2023/0228059 A1 7/2023 Nishikori et al.
2025/0129575 A1* 4/2025 Ueta ......................... E02F 9/24

* cited by examiner

WORKING MACHINE

CROSS REFERENCE TO RELATED APPLICATIONS

This application is a continuation application of International Application No. PCT/JP2023/011388, filed on Mar. 23, 2023, which claims the benefit of priority to Japanese Patent Application No. 2022-061893, filed on Apr. 1, 2022. The entire contents of each of these applications are hereby incorporated herein by reference.

BACKGROUND OF THE INVENTION

1. Field of the Invention

The present invention relates to a working machine such as an excavator (a backhoe).

2. Description of the Related Art

For example, as disclosed in Japanese Unexamined Patent Application Publication No. 2021-80709, a slewable working machine such as an excavator (a backhoe) includes a radiator provided with an electric radiator fan that cools cooling water used for cooling an electric motor and the like and an oil cooler provided with an electric oil cooler fan that cools a hydraulic fluid.

However, the technology in Japanese Unexamined Patent Application Publication No. 2021-80709 does not consider a specific method for controlling the radiator fan and the oil cooler fan.

The present invention has been made to solve the above-mentioned problem of the related art, and it is an object of the present invention to achieve noise reduction, reduction in power consumption, and prevention of excessive cooling in a working machine including an electric fan.

SUMMARY OF THE INVENTION

A working machine according to an aspect of the present invention includes an electric motor, a working device to be driven by power of the electric motor, an operation device to operate the working device, an operation locker switchable between an enabling position where an operation of the working device by the operation device is enabled and a disabling position where the operation of the working device by the operating device is disabled, a cooler including an electric cooling fan, a temperature detector to detect a cooling target temperature that is a temperature of a cooling target to be cooled by the cooler, and a controller to control a fan rotational speed that is a rotational speed of the cooling fan in accordance with the cooling target temperature detected by the temperature detector. The controller is configured or programmed to change a characteristic of the fan rotational speed with respect to the cooling target temperature depending on whether the operation locker is in the enabling position or in the disabling position.

The working machine may include a memory to store a plurality of fan control maps each indicating a characteristic of the fan rotational speed with respect to the cooling target temperature. The plurality of fan control maps may include a first map and a second map that are different from each other. The controller may be configured or programmed to control rotational driving of the cooling fan based on the first map when the operation locker is in the disabling position, and to control the rotational driving of the cooling fan based on the second map when the operation locker is in the enabling position.

The first map may be configured to switch the fan rotational speed between zero and a predetermined first fan rotational speed in accordance with the cooling target temperature.

The first map may be configured to switch the fan rotational speed to the first fan rotational speed when the cooling target temperature increases from a temperature lower than a predetermined first rotation increase temperature to the first rotation increase temperature in a state where the fan rotational speed is zero, and to switch the fan rotational speed to zero when the cooling target temperature decreases to a predetermined first rotation decrease temperature lower than the first rotation increase temperature in a state where the fan rotational speed is set to the first fan rotational speed.

The second map may be configured to set the fan rotational speed to a value greater than zero when the cooling target temperature increases from a temperature lower than a predetermined second rotation increase temperature to the second rotation increase temperature in a state where the fan rotational speed is zero, set the fan rotational speed to a predetermined second fan rotational speed when the cooling target temperature is equal to or higher than a first specified temperature that is set to be higher than the second rotation increase temperature, set the fan rotational speed to become higher, within a range below the second fan rotational speed, as the cooling target temperature increases when the cooling target temperature is equal to or higher than the second rotation increase temperature and lower than the first specified temperature, and reduce the fan rotational speed to zero when the cooling target temperature decreases to a predetermined second rotation decrease temperature lower than the second rotation increase temperature in a state where the fan rotational speed is not zero.

The second map may be configured to set the fan rotational speed to a fixed value less than the second fan rotational speed when the cooling target temperature is lower than a second specified temperature that is set to be equal to or higher than the second rotation increase temperature and to be lower than the first specified temperature and set the fan rotational speed to become higher, within a range below the second fan rotational speed, as the cooling target temperature increases when the cooling target temperature is equal to or higher than the second specified temperature and lower than the first specified temperature.

The plurality of fan control maps may include a third map. The controller may be configured or programmed to set a rotational speed of the electric motor to an idle speed, and control the cooling fan based on the third map when the operation locker is in the enabling position and the operation device is not operated for a certain period of time. The third map may be configured to switch the fan rotational speed to a predetermined auto-idle speed when the cooling target temperature increases from a temperature lower than a predetermined third rotation increase temperature to the third rotation increase temperature in a state where the fan rotational speed is zero, and to switch the fan rotational speed to zero when the cooling target temperature decreases to a predetermined third rotation decrease temperature lower than the third rotation increase temperature in a state where the fan rotational speed is set to the auto-idle speed.

The third map may be common with the first map.

The cooling target of the cooler may be a refrigerant that is used to cool cooling target equipment included in the working machine. The working machine may comprise an abnormally-high-temperature detector to detect an abnormally high temperature of the cooling target equipment. The controller may be configured or programmed to cause the cooling fan to rotate at a third fan rotational speed higher than the second fan rotational speed when the abnormally-high-temperature detector detects an abnormally high temperature and the cooling target temperature is equal to or higher than a third specified temperature that is set to be equal to or higher than the second rotation increase temperature.

The controller may be configured or programmed to cause control of the rotational speed of the cooling fan to return to control based on the second map when the cooling target temperature decreases to a fourth specified temperature that is lower than the third specified temperature in a state where the cooling fan is rotating at the third fan rotational speed.

The second map may be configured to set the fan rotational speed to a fourth fan rotational speed that is higher than the second fan rotational speed when the cooling target temperature increases to a fourth rotation increase temperature that is higher than the first specified temperature in a state where the fan rotational speed is set to the second fan rotational speed and reduce the fan rotational speed to the second fan rotational speed when the cooling target temperature decreases to a predetermined fourth rotation decrease temperature that is lower than the fourth rotation increase temperature and higher than the first specified temperature in a state where the fan rotational speed is set to the fourth fan rotational speed.

The plurality of fan control maps may include a fourth map. The fourth map may be configured to set the fan rotational speed to a value greater than zero when the cooling target temperature increases from a temperature lower than the second rotation increase temperature to the second rotation increase temperature in a state where the fan rotational speed is zero, set the fan rotational speed to a predetermined fifth fan rotational speed that is lower than the second fan rotational speed when the cooling target temperature is equal to or higher than the first specified temperature, set the fan rotational speed to become higher, within a range below the fifth fan rotational speed, as the cooling target temperature increases when the cooling target temperature is equal to or higher than the second rotation increase temperature and lower than the first specified temperature, and reduce the fan rotational speed to zero when the cooling target temperature decreases to the second rotation decrease temperature in a state where the fan rotational speed is not zero. The controller may be configured or programmed to control the cooling fan based on the second map when a rotational speed of the electric motor is set to a high value, and to control the cooling fan based on the fourth map when the rotational speed of the electric motor is set to a low value.

The fourth map may be configured to set the fan rotational speed to a sixth fan rotational speed that is higher than the fifth fan rotational speed when the cooling target temperature increases to a fourth rotation increase temperature that is higher than the first specified temperature in a state where the fan rotational speed is set to the fifth fan rotational speed and reduce the fan rotational speed to the fifth fan rotational speed when the cooling target temperature decreases to a predetermined fourth rotation decrease temperature that is lower than the fourth rotation increase temperature and higher than the first specified temperature in a state where the fan rotational speed is set to the sixth fan rotational speed.

The cooler may be a radiator to cool cooling water that is used to cool equipment including the electric motor. The cooling fan may be a radiator fan included in the radiator. The temperature detector may be configured to detect a temperature of the cooling water as the cooling target temperature.

The cooler may be a radiator to cool cooling water that is used to cool equipment including the electric motor. The cooling fan may be a radiator fan included in the radiator. The temperature detector may detect a temperature of the cooling water as the cooling target temperature.

The working machine may comprise a hydraulic pump to be driven by the electric motor and a hydraulic actuator to be driven by a hydraulic pressure of a hydraulic fluid discharged by the hydraulic pump. The cooler may be an oil cooler to cool the hydraulic fluid, and the cooling fan is an oil cooler fan included in the oil cooler. The temperature detector may be configured to detect a temperature of the hydraulic fluid as the cooling target temperature.

The working machine may comprise a hydraulic pump to be driven by the electric motor and a hydraulic actuator to be driven by a hydraulic pressure of a hydraulic fluid discharged by the hydraulic pump. The cooler may be an oil cooler to cool the hydraulic fluid, and the cooling fan is an oil cooler fan included in the oil cooler. The temperature detector may be configured to detect a temperature of the hydraulic fluid as the cooling target temperature.

The working machine may comprise a hydraulic pump to be driven by the electric motor and a hydraulic actuator to be driven by a hydraulic pressure of a hydraulic fluid discharged by the hydraulic pump. The working machine may comprise a radiator to cool cooling water that is used to cool equipment including the electric motor and an oil cooler to cool the hydraulic fluid, the radiator and the oil cooler each serving as the cooler. The working machine may comprise a radiator fan included in the radiator and an oil cooler fan included in the oil cooler, the radiator fan and the oil cooler fan each serving as the cooling fan. The temperature detector may be configured to detect a temperature of the cooling water and a temperature of the hydraulic fluid, each as the cooling target temperature. The memory may be configured to store a plurality of fan control maps for the radiator fan each indicating a characteristic of a rotational speed of the radiator fan with respect to the temperature of the cooling water and a plurality of fan control maps for the oil cooler fan each indicating a characteristic of a rotational speed of the oil cooler fan with respect to the temperature of the hydraulic fluid. The controller may be configured or programmed to control the rotational speed of the radiator fan based on the plurality of fan control maps for the radiator fan, and control the rotational speed of the oil cooler fan based on the plurality of fan control maps for the oil cooler fan.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
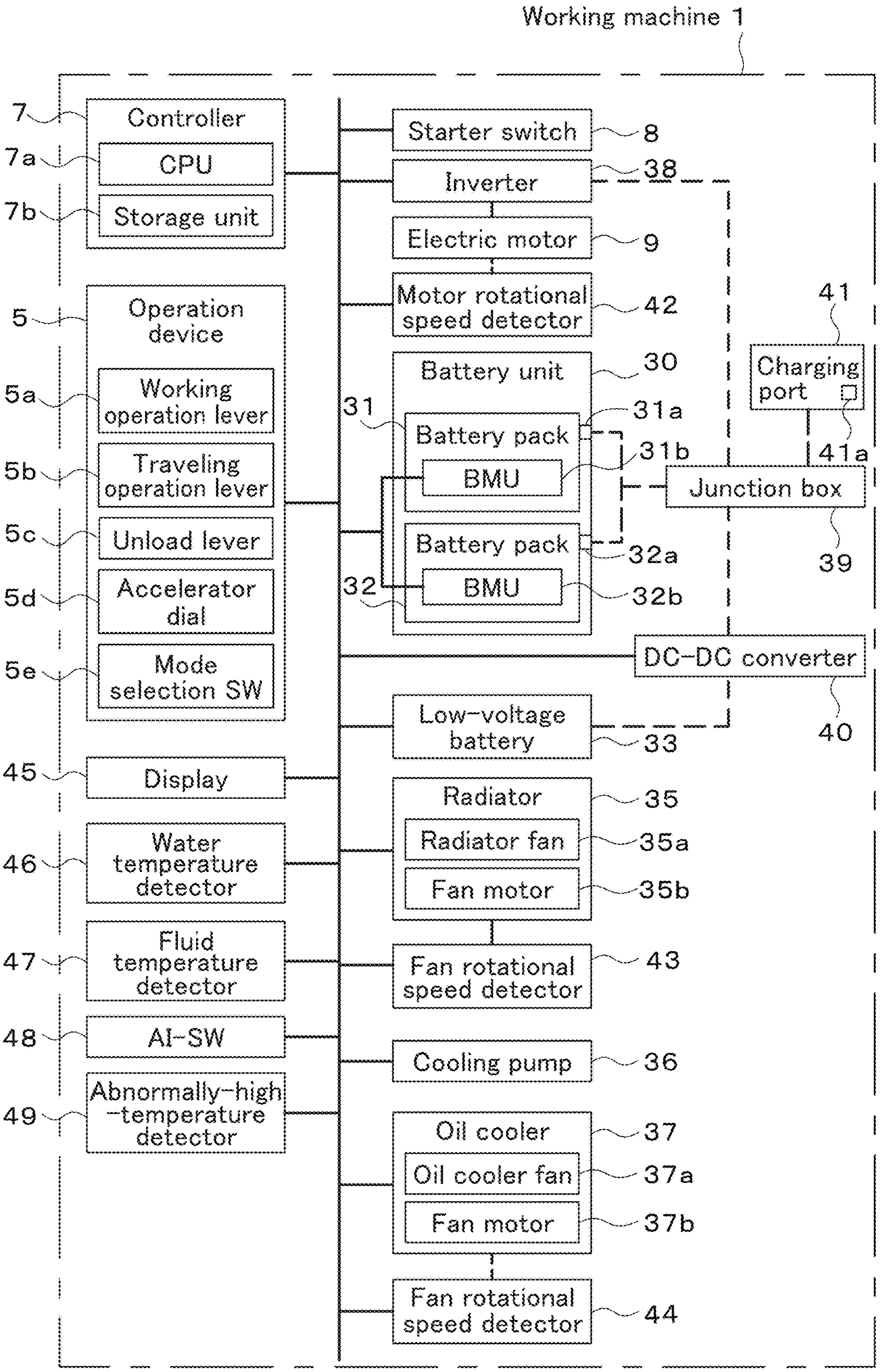
FIG. 1 is a diagram illustrating an electrical system of a working machine.

Example embodiments will now be described with reference to the accompanying drawings, wherein like reference numerals designate corresponding or identical elements throughout the various drawings. The drawings are to be viewed in an orientation in which the reference numerals are viewed correctly.

An example embodiment of the present invention will be described below with reference to the drawings.

First, the overall configuration of a working machine 1 of the present example embodiment will be described with reference to FIG. 7 to FIG. 9 and the like. In the present example embodiment, the working machine 1 is a slewable working machine called a backhoe. The working machine 1 includes a machine body (slewing base) 2, a traveling device 10, a working device 20, and so forth.

The machine body 2 is mounted on an upper portion of the traveling device 10 via a vertical slewing shaft (not illustrated). As illustrated in FIG. 7, it is mounted so as to be relatively rotatable in the horizontal direction with respect to the traveling device 10 about an axis X of the slewing shaft extending in the vertical direction.

In the following description of the working machine 1, a “longitudinal direction” refers to the longitudinal direction of the machine body 2 regardless of the relative rotational position of the traveling device 10 with respect to the machine body 2. In FIG. 7 to FIG. 9, arrow F extends in a direction toward the front of the machine body 2. This direction matches the horizontal direction of an operator’s line of sight, the operator sitting in an operator’s seat 4 illustrated in FIG. 7 and facing forward. The horizontal direction that is opposite to arrow F is toward the rear of the machine body 2.

In the following description of the working machine 1, a “transverse direction” refers to a transverse direction of the machine body 2 (the width direction of the machine body 2) regardless of the relative rotational position of the traveling device 10 with respect to the machine body 2. In FIG. 8 and FIG. 9, arrow L extends toward the left side of the machine body 2.

Figure 8:
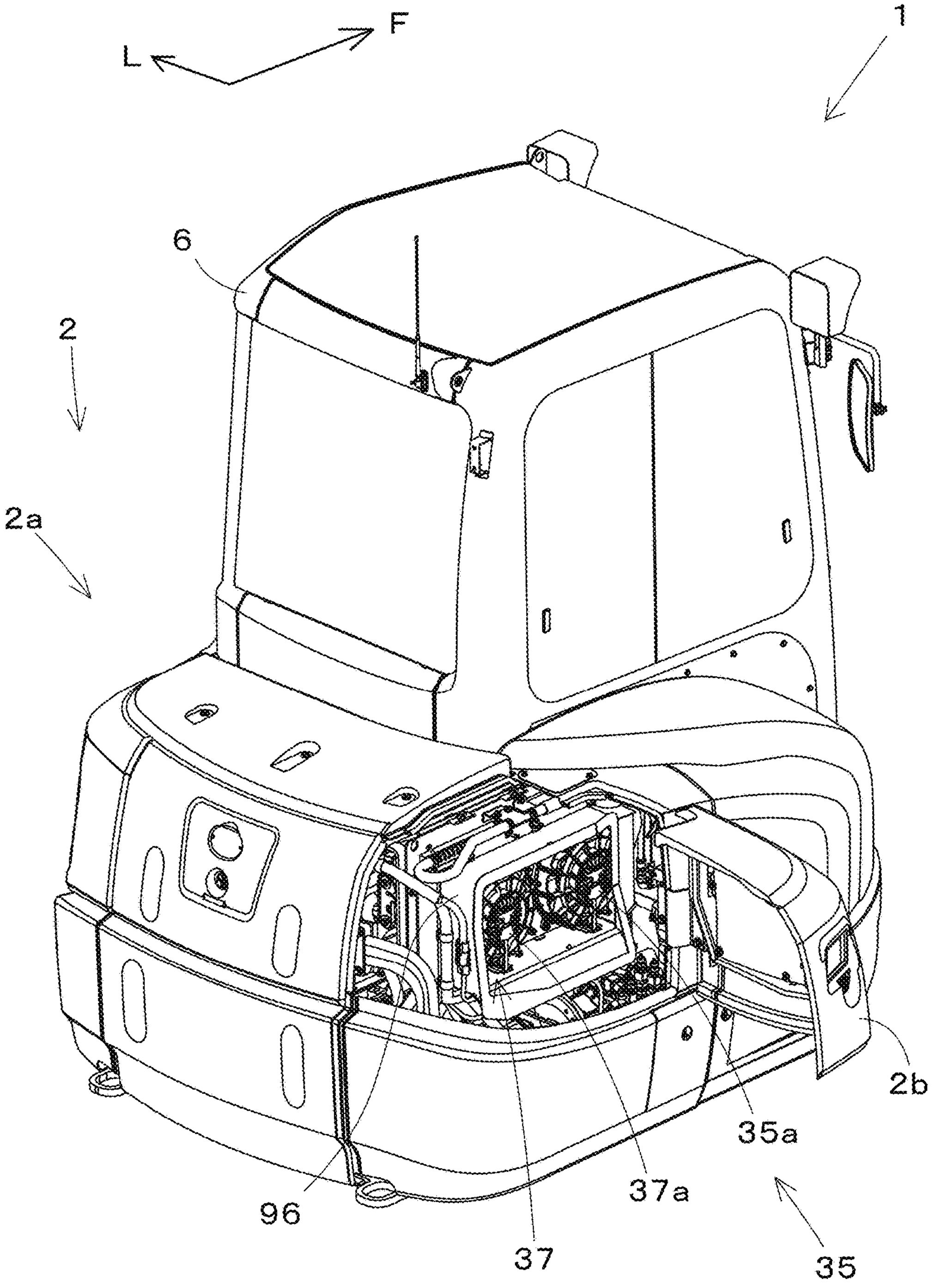
FIG. 8 is a perspective view illustrating a right rear portion of the working machine excluding a traveling device and a working device.
Figure 9:
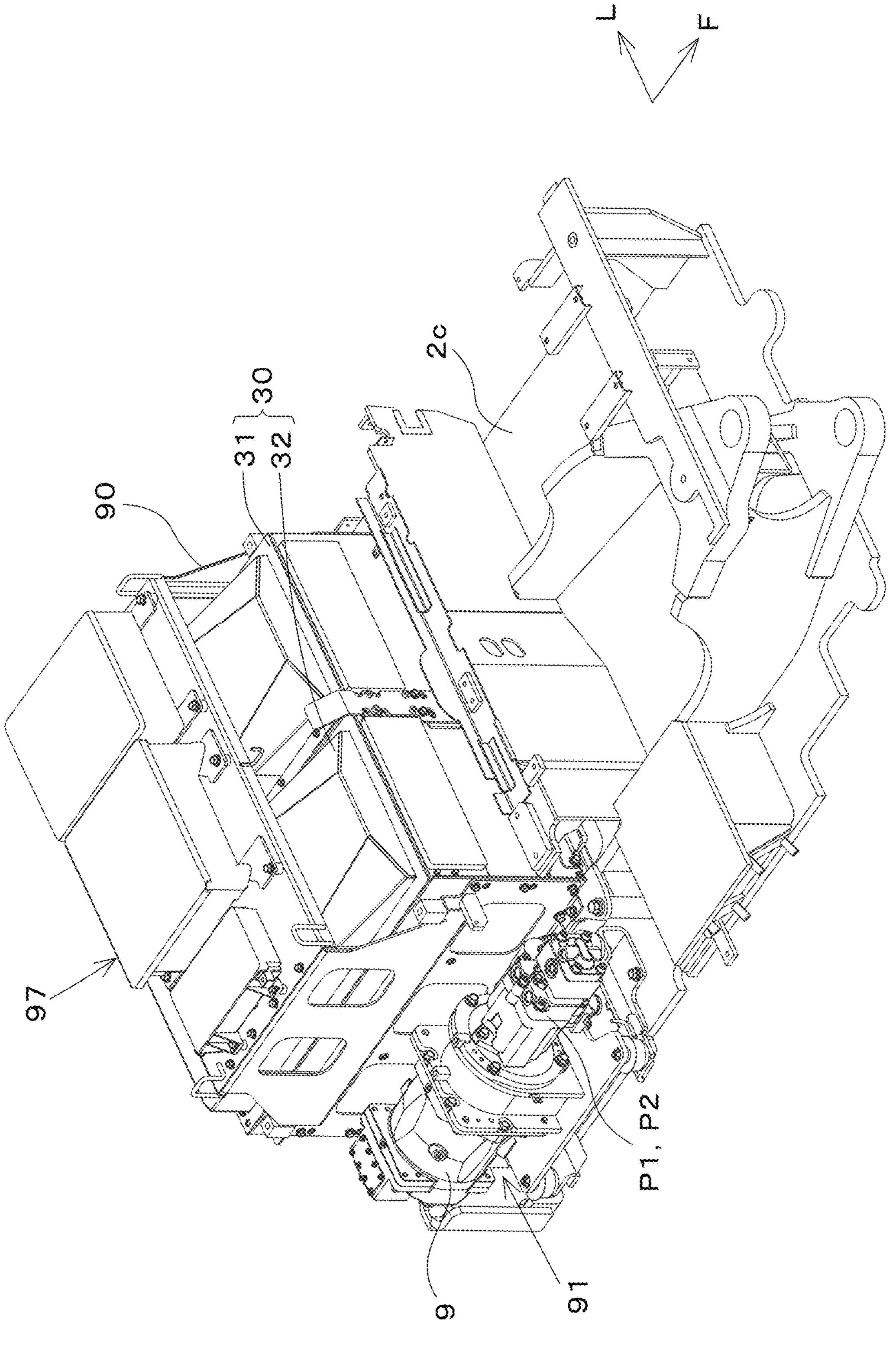
FIG. 9 is a perspective view illustrating an internal structure of a hood of the working machine.

When arrow L is illustrated together with arrow F as in FIG. 8 and FIG. 9, arrow L extends from the starting point of arrow F leftward with respect to arrow F. The direction in which arrow L extends matches the horizontal left direction for the operator sitting in the operator’s seat 4. The horizontal direction that is opposite to arrow Lis toward the right side of the machine body 2.

The front, rear, left, and right positions or directions of each component or each portion of the working machine 1 will hereinafter be described on the basis of the front, rear, left, and right directions of the machine body 2 as described above.

The operator’s seat 4 where the operator (a worker) sits and a protective structure 6 that protects the operator’s seat 4 from the front, rear, left, right, and upper sides are provided on the machine body 2 of the working machine 1. In the present example embodiment, the protective structure 6 is a cabin. As another example embodiment, the protective structure 6 may be a canopy or the like.

Each side surface of the protective structure 6 is provided with a transparent portion (so-called window) through which the surroundings can be viewed from the operator’s seat 4. The protective structure 6 partitions an internal space in which the operator’s seat 4 is provided from the outside.

An operation device 5 for operating the working machine 1 is provided around the operator’s seat 4 inside the protective structure 6. The operator can manipulate the operation device 5 while sitting in the operator’s seat 4.

The traveling device 10 will be described on the assumption that the longitudinal direction of the traveling device 10 and the longitudinal direction of the machine body 2 match each other. The traveling device 10 includes a traveling frame (a track frame) 11 and a left-and-right pair of traveling mechanisms 12. The machine body 2 is supported on an upper portion of the traveling frame 11. Although the traveling mechanisms 12 illustrated in the drawings such as FIG. 7 are each a crawler traveling mechanism, each of the traveling mechanisms 12 may be, for example, a tire (wheel) traveling mechanism.

The traveling mechanisms 12 are provided one each on a left portion and a right portion of the traveling frame 11. Each of the traveling mechanisms 12 includes an idler 13, a drive wheel (drive sprocket) 14, a plurality of track rollers 15, a crawler belt 16 having an endless loop shape, and a corresponding one of traveling motors ML and MR.

The idler 13 is disposed at a front portion of the traveling frame 11. The drive wheel (drive sprocket) 14 is disposed at a rear portion of the traveling frame 11. The plurality of track rollers 15 are arranged between the idler 13 and the drive wheel 14. The crawler belt 16 is wound around the idler 13, the drive wheel 14, and the track rollers 15.

The left traveling motor ML is included in the traveling mechanism 12 provided on the left portion of the traveling frame 11. The right traveling motor MR is included in the traveling mechanism 12 provided on the right portion of the traveling frame 11. The traveling motors ML and MR are hydraulic motors.

In each of the left and right traveling mechanisms 12, each of the traveling motors ML and MR is provided coaxially to a corresponding one of the drive wheels 14, and an output shaft thereof is directly connected to a rotation center shaft of the corresponding drive wheel 14. Each of the traveling motors ML and MR may have a power train, such as a reduction gear train, between it and the corresponding drive wheel 14. That is, it may not necessarily be disposed coaxially to the drive wheel 14.

The crawler belts 16 are driven by rotations of the drive wheels 14, each of which is driven by a corresponding one of the traveling motors ML and MR, and then, the idlers 13 and the track rollers 15 are driven to rotate. Driving the left and right crawler belts 16 enables the traveling device 10 to travel.

The output rotational speeds and the output rotational directions of the left and right traveling motors ML and MR can be controlled independently of each other. By controlling the left and right traveling motors ML and MR to have the same output rotational speed and the same output rotational direction, the traveling device 10, that is, the working machine 1, travels straight forward or rearward. By controlling the left and right traveling motors ML and MR to have different output rotational speeds or different output rotational directions, the working machine 1 turns.

A dozer 18 is mounted on a front portion of the traveling frame 11 and extends toward the front of the traveling device 10. The dozer 18 swings up and down by extension and retraction of a dozer cylinder C5. The dozer cylinder C5 is attached to the traveling frame 11. The dozer cylinder C5 is a hydraulic cylinder.

The machine body 2 is supported on the traveling frame 11 via a slewing bearing 3 so as to be rotatable about the axis X. A slewing motor MT is provided inside the machine body 2. The slewing motor MT is a hydraulic motor that is one of hydraulic actuators. The machine body 2 turns about the axis X by the power of the slewing motor MT.

A swing bracket 24 is provided at a front portion of the machine body 2 so as to be relatively rotatable in the transverse direction with respect to the machine body 2 about a vertical axis (an axis extending in the vertical direction). The working device 20 is supported on the front portion of the machine body 2 via the swing bracket 24. The working device 20 will be described below on the assumption that the longitudinal direction of the working device 20 and the longitudinal direction of the machine body 2 match each other.

The working device 20 includes a boom 21, an arm 22, and a bucket (hydraulic attachment) 23. A base end portion of the boom 21 is pivotally attached to the swing bracket 24 so as to be rotatable about a horizontal axis. Thus, the boom 21 can swing in the vertical direction and the longitudinal direction with respect to the machine body 2. The horizontal axis is defined as an axis with a horizontal axis center along the transverse direction of the machine body 2.

The arm 22 is pivotally attached to an end portion of the boom 21 so as to be rotatable about a horizontal axis. Thus, the arm 22 can swing in the longitudinal direction or the vertical direction. The bucket 23 is provided at an end portion of the arm 22 so as to be capable of performing a shoveling operation and a dumping operation.

The shoveling operation and the dumping operation are relative rotations of the bucket 23 with respect to the arm 22. The shoveling operation is a rotation in a direction toward the boom 21 and the arm 22, and the dumping operation is a rotation in a direction away from the boom 21 and the arm 22.

The working device 20 includes a boom cylinder C2, an arm cylinder C3, and a bucket cylinder C4 as hydraulic actuators (hydraulic cylinders) for causing the boom 21, the arm 22, and the bucket 23 to operate. The machine body 2 is further provided with a swing cylinder C1 that is a hydraulic actuator (a hydraulic cylinder) for causing the swing bracket 24 to rotate.

The swing bracket 24 swings to the left and right with respect to the machine body 2 by extension and retraction of the swing cylinder C1. The boom 21 swings up and down or back and forth with respect to the swing bracket 24 by extension and retraction of the boom cylinder C2. The arm 22 swings up and down or back and forth with respect to the boom 21 by extension and retraction of the arm cylinder C3. The bucket 23 performs the shoveling operation and the dumping operation by extension and retraction of the bucket cylinder (working tool cylinder) C4.

Instead of the bucket 23 or in addition to the bucket 23, another working tool (another hydraulic attachment) that can be driven by a hydraulic actuator can be attached to the end portion of the arm 22. Examples of another working tool include a hydraulic breaker, a hydraulic crusher, an angle broom, an earth auger, a pallet fork, a sweeper, a mower, a snow blower, and the like.

The working machine 1 drives the traveling device 10 by the traveling motors ML and MR, drives the working device 20 and the dozer 18 by the hydraulic cylinders C1 to C5, and turns the machine body 2 by the slewing motor MT so as to perform an operation such as excavation.

In other words, the working machine 1 includes the traveling motors ML and MR, the slewing motor MT, and the hydraulic cylinders C1 to C5 as hydraulic actuators for hydraulically operating the respective components. In the following description, all of these hydraulic actuators will be simply referred to as "hydraulic actuators" unless otherwise stated.

Figure 2:
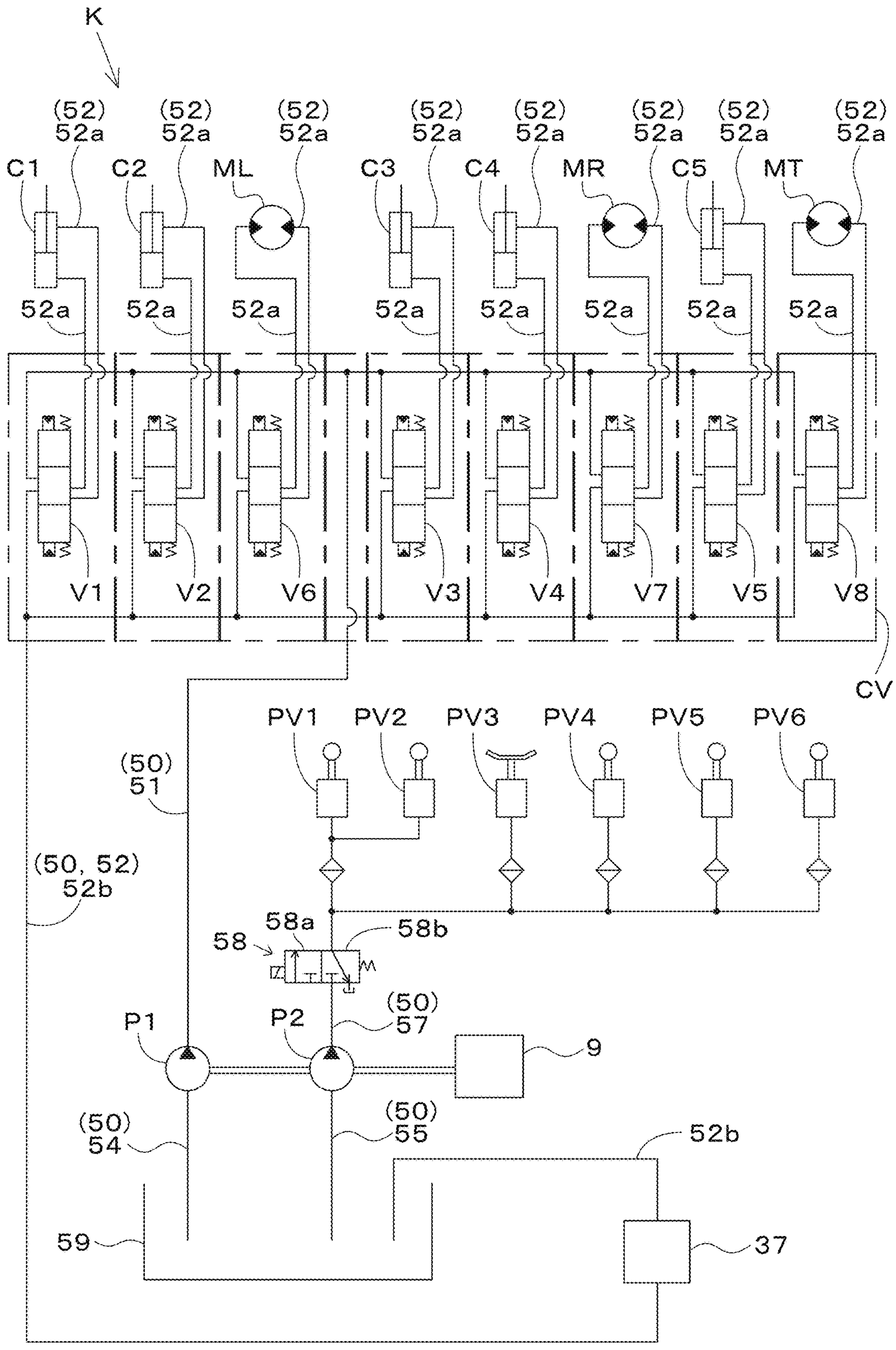
FIG. 2 is a diagram illustrating a hydraulic system of the working machine.

The working machine 1 includes a hydraulic system (a hydraulic circuit K) such as that illustrated in FIG. 2 in order to actuate these hydraulic actuators. This matter will be described in detail later.

Figure 7:
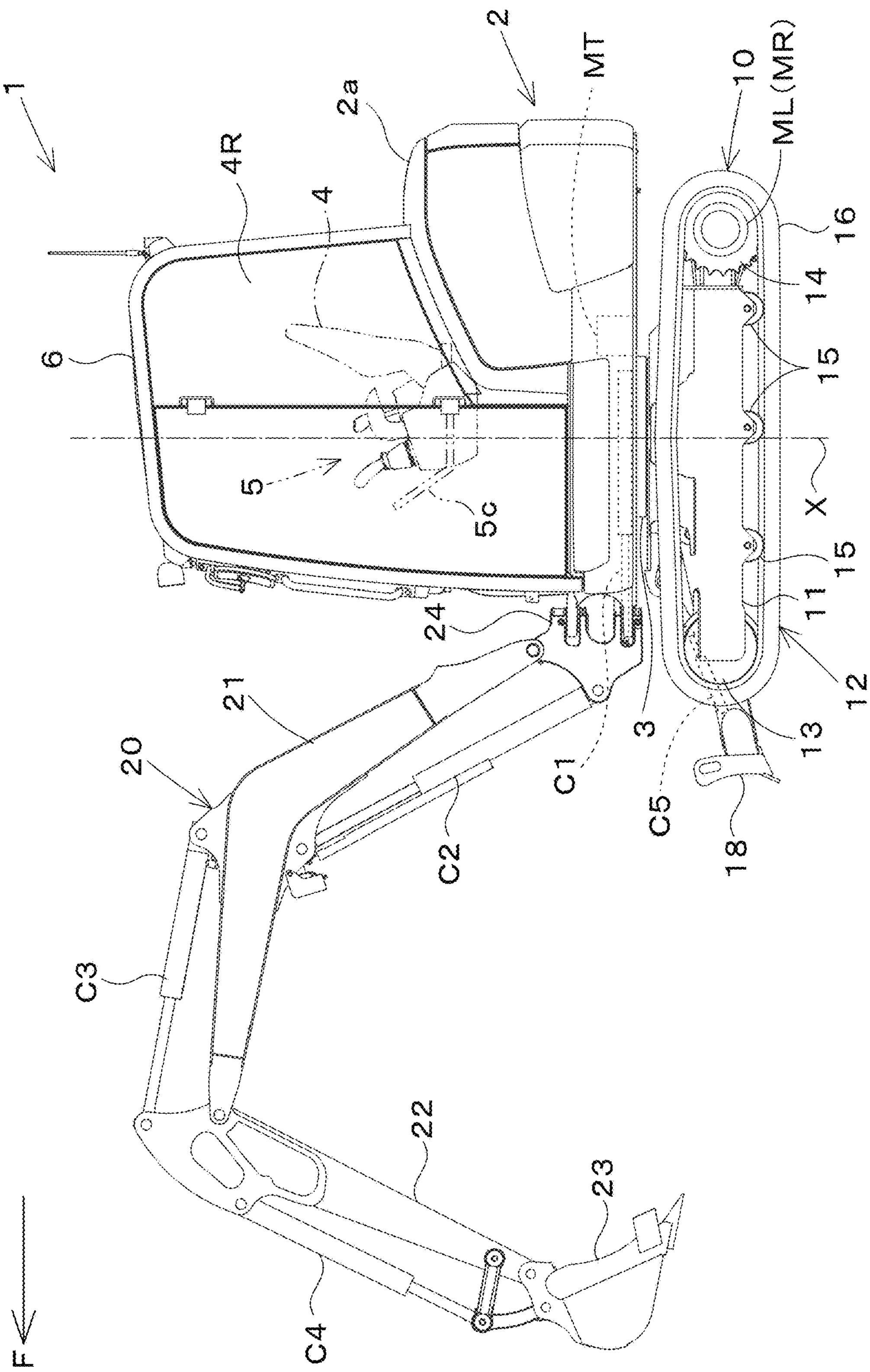
FIG. 7 is an overall side view of the working machine.

As illustrated in FIG. 7, in a hood 2*a* that is formed at a rear portion of the protective structure (cabin) 6 of the machine body 2, as illustrated in FIG. 9, a battery unit 30 that includes a plurality of battery packs 31 and 32 combined together is supported by a support frame 90 in a state where the battery packs 31 and 32 are arranged side by side on the left and right with respect to the machine body 2 and is installed on a base 2*c* that forms a bottom plate of the machine body (slewing base) 2.

As can be seen from FIG. 8, the hood 2*a* of the machine body 2 protrudes rightward from the right end of the protective structure 6. As illustrated in FIG. 9, a motor and pump assembly 91 is installed on the base 2*c* in such a manner as to be located on the right of the battery unit 30 by utilizing a space inside a portion of the hood 2*a* protruding rightward. The motor and pump assembly 91 is formed by combining an electric motor 9 that serves as a prime mover and hydraulic pumps P1 and P2.

Similarly, in the portion of the hood 2*a* expanding rightward, a radiator 35 and an oil cooler 37 are provided on the right of the battery unit 30 in a space above the motor and pump assembly 91 as illustrated in FIG. 8 such that the radiator 35 and the oil cooler 37 are arranged in the longitudinal direction (the radiator 35 is positioned in front of the oil cooler 37) in the present example embodiment).

In this manner, a radiator fan 35*a* of the radiator 35 and an oil cooler fan 37*a* of the oil cooler 37 are arranged in the longitudinal direction and are both oriented toward a right side surface of the hood 2*a*.

A right cover 2*b* of the hood 2*a* has an air outlet port (not illustrated), and hot air exhausted by the radiator fan 35*a* and the oil cooler fan 37*a* is discharged to the outside of the machine body 2 through an air passage, which is defined by a shroud 96, and the air outlet port.

As illustrated in FIG. 8, the right cover 2*b* is openable and closable, and opening the right cover 2*b* allows an access to the radiator fan 35*a*, the oil cooler fan 37*a*, and the like for, for example, maintenance.

In the hood 2*a*, a low-voltage battery 33 illustrated in FIG. 1 is disposed on the left of the battery unit 30. A fan motor 35*b* that drives the radiator fan 35*a*, a fan motor 37*b* that drives the oil cooler fan 37*a*, and the like receive electric power from the low-voltage battery 33. The low-voltage battery 33 can be charged with electric power supplied from the battery packs 31 and 32 of the battery unit 30.

Conversion equipment 97 including an inverter 38, a converter 40, and the like, which will be described later, for supplying the electric power of the battery packs 31 and 32 to the electric motor 9 and to the low-voltage battery 33 is provided at a top portion of the support frame 90.

In the present example embodiment, in particular, electric equipment including the electric motor 9 that operates by receiving high-voltage electric power from the battery packs 31 and 32 will hereinafter sometimes be referred to as high-power equipment, and electric equipment (an electric component) that operates by receiving low-voltage electric power from the low-voltage battery 33 will hereinafter sometimes be referred to as low-power equipment.

Next, each component of the electrical system of the working machine 1 illustrated in FIG. 1 will be described. FIG. 1 is a block diagram illustrating the electrical system of the working machine 1. The working machine 1 includes a controller 7, and the controller 7 includes a CPU 7*a* and a storage unit 7*b*.

The CPU 7*a* controls the operation of each component included in the working machine 1 illustrated in FIG. 1. The storage unit 7*b* includes a volatile memory, a nonvolatile memory, or the like. Information, data, programs, and the like for controlling the operation of each component by the CPU 7*a* are stored in the storage unit 7*b* in a readable and writable manner.

The working machine 1 includes a memory, which stores such data, programs, and the like, as the storage unit 7*b* incorporated in the controller 7. However, such a memory may be provided separately from the controller 7 and may be provided in the form of, for example, an external memory.

The operation device 5 includes manipulators such as a working operation lever 5*a*, a traveling operation lever 5*b*, an unload lever 5*c*, an accelerator dial 5*d*, a mode selection switch (SW) 5*e*, and the like. The operation device 5 further includes a potentiometer, a switch, a sensor, or the like (not illustrated) for detecting whether each of the manipulators 5*a* to 5*e* is manipulated or for detecting the manipulation position or the manipulation amount of each of the manipulators 5*a* to 5*e*.

The working operation lever 5*a* is a member for controlling the operation of the working device 20. The traveling operation lever 5*b* is a member for controlling the operation of the traveling device 10. In FIG. 1, for convenience of description, the working operation lever 5*a* and the traveling operation lever 5*b* are each illustrated as a single block. In practice, however, a plurality of levers each corresponding to the working operation lever 5*a* may be provided, or a plurality of levers each corresponding to the traveling operation lever 5*b* may be provided. These manipulators may be configured as dials, switches, or the like other than levers.

The unload lever 5*c* is a member that is switchable between a load position (a first position, an enabling position) at which the operation of at least one of the hydraulic actuators is enabled and an unload position (a second position, a disabling position) at which the operation of the working device 20 is not allowed (is disabled). The unload lever 5*c* is disposed on, for example, the side of the operator's seat 4 (FIG. 1) so as to be vertically swingable, and in its vertical swing range, the lowermost position and the uppermost position are set to the load position and the unload position, respectively.

When the unload lever 5*c* is swung downward to be located at the load position (the first position, a lowered position), a passage through which the operator gets on and off an operation room 4R is closed. When the unload lever 5*c* is swung upward to be located at the unload position (the second position, a raised position), the passage is opened.

The accelerator dial 5*d* is rotationally manipulated in order to set a target rotational speed of the electric motor 9. By changing the manipulation position of the accelerator dial 5*d*, that is, the turning angle of the accelerator dial 5*d*, the target rotational speed of the electric motor 9 can be changed. The controller 7 calculates an instruction value for the rotational speed of the electric motor 9 in accordance with the manipulation position (manipulation amount) of the accelerator dial 5*d* and instructs the electric motor 9 to rotate at the rotational speed corresponding to the instruction value.

The mode selection SW 5*e* is a switch to be manipulated in order to select either a normal mode (a first mode) or an ECO mode (an ecology mode, a second mode) for controlling driving of the electric motor 9. In the ECO mode, power consumption is reduced more than in the normal mode.

When the normal mode is selected by using the mode selection SW 5*e*, a high idle speed MS1 (see FIG. 5) that is a rotational speed for a high-speed rotation motor is set as a motor rotational speed MS of the electric motor 9. An example of the value of the high idle speed MS1 may be 2200 rpm.

In contrast, when the ECO mode is selected by using the mode selection SW 5*e*, a low idle speed MS2 (see FIG. 5) that is a rotational speed for a low-speed rotation motor is set as the motor rotational speed MS of the electric motor 9. An example of the value of the low idle speed MS2 may be 1000 rpm.

When, for example, an auto-idling control is executed as described later, the electric motor 9 is driven at an idle speed MS3 (see FIG. 5) that is lower than the low idle speed MS2. An example of the value of the idle speed MS3 may be 250 rpm.

A starter switch (SW) 8 is provided inside the protective structure 6 such that the operator sitting in the operator's seat 4 can manipulate the starter SW 8. The starter SW 8 is manipulated in order to start and stop the working machine 1.

When the starter SW 8 is turned on, the controller 7 activates the electric motor 9, which is a prime mover, and activates each component of the working machine 1. When the starter SW 8 is turned off, the controller 7 stops the electric motor 9 and stops each component of the working machine 1.

The electric motor 9 that is a prime mover of the working machine 1 includes, for example, a permanent-magnet-embedded three-phase AC synchronous motor. The inverter 38 is a motor driver that drives the electric motor 9. The inverter 38 is connected to the electric motor 9 and a junction box 39.

The junction box 39 is connected to the battery unit 30, the DC-DC converter 40, and a charging port 41, in addition to the inverter 38. The junction box 39 outputs electric power that is output by the battery unit 30 to the inverter 38 and the DC-DC converter 40.

The inverter 38 converts direct-current power that is input thereto from the battery unit 30 via the junction box 39 into three-phase alternating-current power and supplies this three-phase alternating-current power to the electric motor 9. As a result, the electric motor 9 is driven. The inverter 38 can appropriately adjust the current and the voltage of the electric power that is supplied to the electric motor 9. The controller 7 drives or stops the electric motor 9 by controlling the operation of the inverter 38.

A motor rotational speed detector 42 includes a sensor that detects the rotational speed (actual rotational speed) of the electric motor 9, an encoder, a pulse generator, or the like. The controller 7 controls the driving of the electric motor 9 by the inverter 38 on the basis of the rotational speed (actual rotational speed) of the electric motor 9 detected by the motor rotational speed detector 42.

For example, the controller 7 controls the driving of the electric motor 9 by the inverter 38 such that the actual rotational speed of the electric motor 9 detected by the motor rotational speed detector 42 is equal to the target rotational speed (a value set by the accelerator dial 5*d* or predetermined rotational speeds R1 to R3, which will be described later).

The DC-DC converter 40 is a voltage converter that converts a voltage of direct-current power that is input thereto from the battery unit 30 via the junction box 39 into a different voltage. In the present example embodiment, the DC-DC converter 40 is a step-down converter that converts a high voltage from the battery unit 30 into a predetermined low voltage corresponding to the above-mentioned low-power equipment (electric component) included in the working machine 1.

The DC-DC converter 40 supplies electric power to the low-voltage battery 33 after performing voltage conversion. The working machine 1 includes the above-mentioned low-power equipment (electric components) such as an illuminator, a heater, and the like in addition to the units illustrated in FIG. 1, and these low-power equipment (electric components) are operated by using the electric power from the low-voltage battery 33.

The charging port 41 includes a connector (not illustrated), into which a charging cable (not illustrated) is fitted, and a connection detector 41*a*. The charging port 41 is connected to an external power supply (such as a commercial power supply or the like) via the charging cable. The connection detector 41*a* includes a sensor or the like that detects that the charging cable is fitted into the charging port 41 and that the external power supply is connected to the charging port 41.

The junction box 39 outputs electric power that is input through the charging port 41 from the external power supply via the charging cable to the battery unit 30. The battery unit 30 is charged with the electric power input from the charging port 41 via the junction box 39.

The battery unit 30 includes a plurality of battery packs 31 and 32. Each of the battery packs 31 and 32 is a secondary battery (a storage battery) such as a lithium ion battery that includes at least one battery.

When each of the battery packs 31 and 32 includes a plurality of batteries, the plurality of batteries are electrically connected in series and/or in parallel. The battery included in each of the battery packs 31 and 32 has a plurality of cells therein, and the plurality of cells are electrically connected in series and/or in parallel.

Each of the battery packs 31 and 32 has an electric capacity with which each component of the working machine 1 can operate for a certain period of time. The battery packs 31 and 32 are connected to each other in parallel.

In the present example embodiment, the battery unit 30 includes the two battery packs 31 and 32. However, the number of battery packs included in the battery unit 30 is not limited to two and may be one or may be three or more.

The battery packs 31 and 32 are provided with connection switches 31*a* and 32*a*, respectively. Each of the connection switches 31*a* and 32*a* includes, for example, a relay, a switch, or the like and is switchable between a connected state and a disconnected state.

The controller 7 switches one of the connection switches 31*a* and 32*a* to the connected state and switches the other of the connection switches 31*a* and 32*a* to the disconnected state, so that one of the plurality of battery packs 31 and 32 outputs electric power to the junction box 39, and the other of the plurality of battery packs 31 and 32 stops outputting electric power. In other words, the controller 7 controls the output and stop of output of the electric power from each of the battery packs 31 and 32.

The controller 7 switches the connection state inside the junction box 39 so as to connect or disconnect the inverter 38, the DC-DC converter 40, or the charging port 41 to or from each of the battery packs 31 and 32. The junction box 39 and the connection switches 31*a* and 32*a* are included in a connection switcher that switches between connection and disconnection of the inverter 38, the DC-DC converter 40, and the charging port 41 to and from the battery packs 31 and 32.

The battery packs 31 and 32 are also provided with battery management units (BMUs) 31*b* and 32*b*, respectively. In FIG. 1, although the BMUs 31*b* and the 32*b* are disposed inside the battery packs 31 and 32, respectively, the BMUs 31*b* and the 32*b* may be incorporated in their respective battery packs 31 and 32 or may be disposed outside their respective battery packs 31 and 32.

The BMU 31*b* monitors and controls the corresponding battery pack 31. The BMU 32*b* monitors and controls the corresponding battery pack 32. More specifically, the BMUs 31*b* and the 32*b* control opening and closing of relays provided inside their respective battery packs 31 and 32 so as to control start and stop of supply of the electric power from the battery packs 31 and 32. The BMUs 31*b* and 32*b* also detect the temperatures, the voltages, or the currents of their respective battery packs 31 and 32 or detect the terminal voltages of the cells inside their respective battery packs 31 and 32, or the like.

The BMUs 31*b* and 32*b* further detect, on the basis of, for example, the terminal voltages of the cells inside their respective battery packs 31 and 32, the remaining capacities (remaining amounts of power) of their respective battery packs 31 and 32 by a voltage measurement method.

The method of detecting the remaining capacities of the battery packs 31 and 32 is not limited to the voltage measurement method and may be a different method, such as a coulomb counting method, a battery-cell modeling method, or an impedance tracking method. A capacity detector that detects the remaining capacities of the battery packs 31 and 32 may be provided separately from the BMUs 31*b* and 32*b*.

The low-voltage battery 33 is a storage battery having a voltage lower than that of the battery unit 30. The low-voltage battery 33 is charged with electric power supplied from the DC-DC converter 40. The low-voltage battery 33 supplies electric power to the above-mentioned electric components included in the working machine 1.

High-heat-generating electrical equipment including the electric motor 9, the inverter 38, the DC-DC converter 40, the battery unit 30, and the like is cooling target equipment to be cooled by cooling water, and the radiator 35 cools the cooling water. The cooling water is not simply water and includes, for example, a liquid that does not freeze even in a cold region.

The high-heat-generating electrical equipment, which is the cooling target equipment to be cooled with cooling water cooled by the radiator 35, is electrical equipment that operates by receiving electric power and generates higher temperature heat than other electrical equipment included in the working machine 1, corresponding to the above-mentioned high-power equipment. The high-power equipment each includes a temperature sensor, and these temperature sensors function as abnormally-high-temperature detectors 49 each of which detects an abnormally high temperature of the corresponding high-power equipment.

For each high-power equipment, an upper temperature limit is set, and when the actual temperature reaches this upper limit, the operation is stopped in order to protect the high-power equipment. During a high temperature state before reaching the upper limit, output reduction (derating) of the high-power equipment is performed. The abnormally high temperature detected by each of the abnormally-high-temperature detectors 49 is a temperature at the stage prompting this derating, before reaching the upper temperature limit.

The radiator 35 includes a heat exchanger (not illustrated), the radiator fan 35*a*, and the fan motor 35*b*. The radiator fan 35*a* rotates in response to the output of the fan motor 35*b* and releases heat recovered from the cooling water by the heat exchanger to the outside of the machine body 2 or the like. The fan motor 35*b* is driven by electric power of the low-voltage battery 33. A fan rotational speed detector 43 detects the rotational speed of the radiator fan 35*a*.

The cooling pump 36 is disposed on a cooling water passage (not illustrated) that is provided in the machine body 2 together with the radiator 35 and the high-heat-generating electrical equipment mentioned above. The cooling pump 36 discharges the cooling water to the cooling water passage.

The oil cooler 37 cools a hydraulic fluid that has passed through hydraulic equipment such as the above-mentioned hydraulic actuators ML, MR, MT, and C1 to C5, the hydraulic pumps P1 and P2, which will be described later, and a control valve unit CV (illustrated in FIG. 2 and the like), which will be described later. In other words, a cooling target that is to be cooled by the oil cooler 37 is the hydraulic fluid.

The oil cooler 37 includes a heat exchanger (not illustrated), the oil cooler fan 37*a*, and the fan motor 37*b*. The oil cooler fan 37*a* rotates in response to the output of the fan motor 37*b* and releases heat recovered from the hydraulic fluid by the heat exchanger to the outside of the machine body 2 or the like. The fan motor 37*b* is driven by electric power of the low-voltage battery 33. A fan rotational speed detector 44 detects the rotational speed of the oil cooler fan 37*a*.

A display 45 includes a liquid crystal display, a touch panel, or the like and displays various information items. A water temperature detector 46 detects the temperature of the cooling water circulating through the cooling water passage. A fluid temperature detector 47 detects the temperature of the hydraulic fluid, particularly, the temperature of the hydraulic fluid at the stage of being returned to a hydraulic fluid tank 59, which will be described later, after being used in the operation of the hydraulic actuator or the like.

An auto-idling switch (AI-SW) 48 is a pressure sensor that is operated by the hydraulic pressure of the hydraulic fluid supplied to the above-mentioned hydraulic actuators C1 to C5, ML, MR, and MT. The AI-SW 48 is brought into an ON state when at least one of the hydraulic actuators C1 to C5, ML, MR, and MT is operating and is brought into an OFF state when none of these hydraulic actuators is operating.

In other words, the AI-SW 48 detects whether any one of the working device 20, the traveling device 10, and the like that are to be driven by the hydraulic actuators C1 to C5, ML, MR, and MT is operating.

Next, a hydraulic circuit (the hydraulic system) included in the working machine 1 will be described. FIG. 2 is a diagram illustrating the hydraulic circuit K of the working machine 1. The hydraulic circuit K includes hydraulic equipment such as the hydraulic actuators C1 to C5, ML, MR, and MT, the control valve unit CV, the hydraulic pumps P1 and P2, the hydraulic fluid tank 59, the oil cooler 37, operation valves PV1 to PV6, an unloading valve 58, a fluid passage 50, and so forth.

One of the plurality of hydraulic pumps P1 and P2 is an operating hydraulic pump P1, and the other is a control hydraulic pump P2. These hydraulic pumps P1 and P2 are driven by the power of the electric motor 9.

More specifically, as illustrated in FIG. 9, the motor and pump assembly 91 installed in the hood 2*a* includes the electric motor 9 and the hydraulic pumps P1 and P2. An output shaft of the electric motor 9 is extended so as to function as an input shaft (a pump shaft) of the hydraulic pumps P1 and P2.

The operating hydraulic pump P1 draws in the hydraulic fluid stored in the hydraulic fluid tank 59 and then discharges the hydraulic fluid toward the control valve unit CV. In FIG. 2, the single operating hydraulic pump P1 is illustrated for convenience of description. However, the present invention is not limited to this, and an appropriate number of operating hydraulic pumps P1 may be provided such that the hydraulic fluid can be supplied to each of the hydraulic actuators C1 to C5, ML, MR, and MT.

The control hydraulic pump P2 draws in the hydraulic fluid stored in the hydraulic fluid tank 59 and then discharges the hydraulic fluid so as to output a hydraulic pressure for signal, control, or the like. In other words, the control hydraulic pump P2 supplies (discharges) a pilot fluid for controlling (switching) the positions of control valves V1 to V8. An appropriate number of control hydraulic pumps P2 may also be provided.

The control valve unit CV includes the plurality of control valves V1 to V8 combined together. The control valves V1 to V8 adjust control (adjustment) of the flow rates of the hydraulic fluid to be output from the hydraulic pumps P1 and P2 to the hydraulic actuators C1 to C5, ML, MR, and MT.

Among the control valves V1 to V8, the control valves V1 to V4 are used for controlling the working device 20. The swing control valve V1 controls the flow rate and the flow direction of the hydraulic fluid to be supplied to the swing cylinder C1. The boom control valve V2 controls the flow rate and the flow direction of the hydraulic fluid to be supplied to the boom cylinder C2. The arm control valve V3 controls the flow rate and the flow direction of the hydraulic fluid to be supplied to the arm cylinder C3. The bucket control valve V4 controls the flow rate and the flow direction of the hydraulic fluid to be supplied to the bucket cylinder C4.

The dozer control valve V5 controls the flow rate of the hydraulic fluid to be supplied to the dozer cylinder C5. The left traveling control valve V6 controls the flow rate of the hydraulic fluid to be supplied to the left traveling motor ML. The right traveling control valve V7 controls the flow rate of the hydraulic fluid to be supplied to the right traveling motor MR. The turn control valve V8 controls the flow rate of the hydraulic fluid to be supplied to the slewing motor MT.

Regarding the left traveling motor ML, the right traveling motor MR, the left traveling control valve V6, and the right traveling control valve V7, the term "left" is used for those for the left traveling mechanism 12, and the term "right" is used for those for the right traveling mechanism 12. The terms "left" and "right" do not necessarily refer to the actual left and right positional relationship.

The operation valves (remote control valves) PV1 to PV6 are solenoid valves and are operated in response to manipulation of the operation levers 5*a* and 5*b* (FIG. 1), which are included in the operation device 5. The pilot fluid acts on the control valves V1 to V8 in proportion to the operation amounts (manipulation amounts) of the operation valves PV1 to PV6, so that spools of the control valves V1 to V8 moves linearly.

The hydraulic fluid at flow rates proportional to the amounts of movement of the spools of the control valves V1 to V8 is supplied to the hydraulic actuators C1 to C5, ML, MR, and MT, which are to be controlled. In this manner, the hydraulic actuators C1 to C5, ML, MR, and MT are driven in accordance with the amounts of the hydraulic fluid supplied from the control valves V1 to V8.

In other words, by manipulating the operation levers 5*a* and 5*b*, the hydraulic fluid serving as the pilot fluid that acts on each of the control valves V1 to V8 is adjusted, so that the control valves V1 to V8 are controlled. Then, the flow rates and the flow directions of the hydraulic fluid to be supplied from the control valves V1 to V8 to the hydraulic actuators C1 to C5, ML, MR, and MT are adjusted so as to control the driving and stopping of the hydraulic actuators C1 to C5, ML, MR, and MT.

The fluid passage 50 includes, for example, a hose or a pipe that is made of a material such as a metal or the like. The fluid passage 50 is a flow passage that connects the components of the hydraulic circuit K to each other and allows the hydraulic fluid or the pilot fluid to flow to each of the component. The fluid passage 50 includes a first fluid passage 51, a second fluid passage 52, a first suction fluid passage 54, a second suction fluid passage 55, and a control fluid passage 57.

The first suction fluid passage 54 is a flow passage through which the hydraulic fluid that has been drawn in by the operating hydraulic pump P1 from the hydraulic fluid tank 59 flows. The second suction fluid passage 55 is a flow passage through which the hydraulic fluid that has been drawn in by the control hydraulic pump P2 from the hydraulic fluid tank 59 flows.

The first fluid passage 51 is a flow passage through which the hydraulic fluid discharged by the operating hydraulic pump P1 flows toward the control valves V1 to V8 of the control valve unit CV. In the control valve unit CV, the first fluid passage 51 is branched into a plurality of passages, and the plurality of passages are connected to their respective control valves V1 to V8.

The second fluid passage 52 is a flow passage through which the hydraulic fluid that has passed through the control valves V1 to V8 flows toward the hydraulic fluid tank 59. The hydraulic fluid tank 59 stores the hydraulic fluid. The second fluid passage 52 includes a forward-and-return fluid passages 52*a* and a discharge fluid passage 52*b*.

Each two of the forward-and-return fluid passages 52*a* are paired with each other, and each of the pairs of forward-and-return fluid passages 52*a* are interposed between one of the control valves V1 to V8 and a corresponding one of the hydraulic actuators C1 to C5, ML, MR, and MT to be controlled. The forward-and-return fluid passages 52*a* are flow passages through which the hydraulic fluid is supplied from the control valves V1 to V8 connected thereto the hydraulic actuators C1 to C5, ML, MR, and MT and through which the hydraulic fluid is returned from the hydraulic actuators C1 to C5, ML, MR, and MT to the control valves V1 to V8.

One end of the discharge fluid passage 52*b* is branched into a plurality of passages, and the plurality of passages are connected to their respective control valves V1 to V8. The other end of the discharge fluid passage 52*b* is connected to the hydraulic fluid tank 59.

Some of the hydraulic fluid that has flown to one of the control valves V1 to V8 through the first fluid passage 51 passes through the one of the control valves V1 to V8 and passes through one of the corresponding pair of fluid passages defining the forward-and-return fluid passages 52*a*, so as to be supplied to a corresponding one of the hydraulic actuators C1 to C5, ML, MR, and MT to be controlled.

The hydraulic fluid discharged from the one of the hydraulic actuators C1 to C5, ML, MR, and MT returns to the one of the control valves V1 to V8 fluidly connected thereto by passing through the other one of the pair of fluid passages defining the forward-and-return fluid passages 52*a*, and flows toward the discharge fluid passage 52*b* by passing through the one of the control valves V1 to V8.

The remaining hydraulic fluid that has flown to the other ones of the control valves V1 to V8 by passing through the first fluid passage 51 is not supplied to the corresponding ones of the hydraulic actuators C1 to C5, ML, MR, and MT and flows into the discharge fluid passage 52*b* by passing through the other ones of the control valves V1 to V8.

The oil cooler 37 is disposed in the discharge fluid passage 52*b*. The oil cooler 37 cools the hydraulic fluid flowing thereto from any one of the control valves V1 to V8 through the discharge fluid passage 52*b*. The hydraulic fluid cooled by the oil cooler 37 returns to the hydraulic fluid tank 59 by passing through the discharge fluid passage 52*b*.

As described above, the fluid passages 54, 51, and 52 are arranged so as to cause the hydraulic fluid to circulate among the hydraulic fluid tank 59, the hydraulic pump P1, and the control valves V1 to V8 of the control valve unit CV while some of the hydraulic fluid also circulates through the hydraulic actuators C1 to C5, ML, MR, and MT.

The control fluid passage 57 is a flow passage through which the hydraulic fluid discharged by the control hydraulic pump P2 flows to the operation valves PV1 to PV6. One end of the control fluid passage 57 is connected to the control hydraulic pump P2. The other end of the control fluid passage 57 is branched into a plurality of passages, and the plurality of passages are connected to primary-side ports (primary ports) of the respective operation valves PV1 to PV6.

The operation valves PV1 to PV6 are solenoid valves, and the opening degrees of the operation valves PV1 to PV6 are adjusted on the basis of command signals output by the controller 7. By adjusting the opening degrees, the flow rates at which the pilot pressure fluid flows toward the control valves V1 to V8 are adjusted.

The unloading valve 58 that includes a two-position switching valve is disposed in the control fluid passage 57. The unloading valve 58 is a two-position switching valve that has a fluid supplying position 58*a* and a fluid blocking position 58*b* as its switching positions, and is switched to either the fluid supplying position 58*a* or the fluid blocking position 58*b* in conjunction with the manipulation of the unload lever 5*c* (FIG. 1).

When the unload lever 5*c* is manipulated to be located at the load position (the lowered position), the unloading valve 58 is switched to the fluid supplying position 58*a* (a load position), and the hydraulic fluid discharged from the control hydraulic pump P2 to the control fluid passage 57 is supplied to the operation valves PV1 to PV6, so that the operations of the control valves V1 to V8 are enabled.

This allows the supply of the hydraulic fluid from the operating hydraulic pump P1 to the hydraulic actuators C1 to C5, ML, MR, and MT, enabling the operations of these hydraulic actuators. The hydraulic fluid discharged from the operation valves PV1 to PV6 returns to the hydraulic fluid tank 59 by passing through another discharge fluid passage (not illustrated).

When the unload lever 5*c* is manipulated to be located at the unload position (the raised position), the unloading valve 58 is switched to the fluid blocking position 58*b* (an unload position), and the hydraulic fluid discharged from the control hydraulic pump P2 to the control fluid passage 57 is discharged to the hydraulic fluid tank 59 without being supplied to the operation valves PV1 to PV6, so that the operations of the control valves V1 to V8 are disabled.

As a result, the supply of the hydraulic fluid from the operating hydraulic pump P1 to the hydraulic actuators C1 to C5, ML, MR, and MT is disabled (blocked), and the operations of all the hydraulic actuators are disabled.

In the present example embodiment, a configuration has been described in which the unloading valve 58 is switched in accordance with the manipulation of the unload lever 5*c* so as to switch the supply and discharge states of the hydraulic fluid to and from the operation valves PV1 to PV6, thereby switching between enabling and disabling the operations of the working device 20 and the traveling device 10 by the operation device 5. However, the present invention is not limited to this configuration.

For example, a solenoid valve that switches the operations of some or all of the control valves V1 to V8 may be provided, and a controller that controls the operation of this solenoid valve may control the operation of the solenoid valve in accordance with the switching position of the unload lever 5*c* so as to switch the working device 20 and the traveling device 10 between an operable state and an inoperable state.

The working device 20 and the traveling device 10 may be entirely or partially caused to operate by one or more electric actuators, and a controller that controls the operation of the one or more electric actuators may control the operation of the one or more electric actuators in accordance with the switching position of the unload lever 5*c* so as to switch the working device 20 and the traveling device 10 between the operable state and the inoperable state.

The working device 20, the traveling device 10, the dozer 18, and the like that are operated by the working operation lever 5*a* and the traveling operation lever 5*b* (hereinafter referred to as "operation levers 5*a* and 5*b*" or simply referred to as the "operation device") of the operation device 5 will hereinafter be collectively referred to as working devices (regardless of whether or not they are hydraulic, electric, or the like).

In other words, the unload lever 5*c* is an operation locker that is switchable between the enabling position at which the operations of the working devices by the operation device (the operation levers 5*a* and 5*b*) are enabled and the disabling position at which the operation of the working devices by the operation device (the operation levers 5*a* and 5*b*) are disabled. The hydraulic circuit K includes, in addition to those mentioned above, an operation detecting fluid passage (not illustrated) for detecting the operating states of the control valves V1 to V8. The operation detecting fluid passage is a fluid passage that is used for causing the pilot fluid discharged from the control hydraulic pump P2 to return to the hydraulic fluid tank 59 by sequentially passing through a plurality of switching valves for switching the positions of the control valves V1 to V8. The AI-SW 48 (FIG. 1) is connected to this operation detecting fluid passage.

When any one of the control valves V1 to V8 is operated from a neutral position to a switching position, the above-mentioned operation detecting fluid passage is partially blocked, and the pressure of the pilot fluid in the operation detecting fluid passage increases to a certain level (a so-called pressurized state), so that the AI-SW 48 is brought into the ON state. In other words, at least one of the hydraulic actuators C1 to C5, ML, MR, and MT being in operation is detected by the AI-SW 48.

When all of the control valves V1 to V8 are in their neutral positions, the operation detecting fluid passage is open, and thus, the pressure of the pilot fluid in the operation detecting fluid passage does not increase to a certain level (a so-called non-pressurized state), so that the AI-SW 48 is brought into the OFF state. In other words, none of the hydraulic actuators C1 to C5, ML, MR, and MT being in operation is detected by the AI-SW 48.

When the unload lever 5*c* is in the load position (lowered position), that is, when the unloading valve 58 is in the fluid supplying position 58*a*, the AI-SW 48 is in the ON state as long as at least one of the hydraulic actuators C1 to C5, ML, MR, and MT is in operation.

However, if a state in which none of the hydraulic actuators are operating despite the unload lever 5*c* being in the load position (lowered position) occurs, and if this state continues for a certain period of time, the AI-SW 48 is switched to the OFF state. In response to the switching of the AI-SW 48 to the OFF state, the controller 7 issues a command to set the motor rotational speed MS of the electric motor 9 to the idle speed MS3 (see FIG. 5). This control of the electric motor 9 will hereinafter be referred to as auto-idling control.

The working machine 1 includes the electrical system and the hydraulic system having the above-described structures, and the working machine 1 includes the radiator 35 and the oil cooler 37, which have been described above, as coolers that cool their cooling targets. The cooling targets are the cooling water and the hydraulic fluid circulating through the equipment that belongs to the electrical system and the hydraulic system.

The coolers each include an electric cooling fan. In other words, the radiator 35 includes the radiator fan 35*a* that is rotationally driven by the output of the electric fan motor 35*b*, and the oil cooler 37 includes the oil cooler fan 37*a* that is rotationally driven by the output of the electric fan motor 37*b*.

In the case of a working machine that includes an engine (an internal combustion engine) as a prime mover, a radiator fan of a radiator attached along the engine is configured to rotate synchronously with an engine output shaft via a fan belt or the like, and thus, in principle, the radiator fan continuously rotates while the engine is rotating. The rotational speed of the radiator fan also changes synchronously with the change in the engine rotational speed.

In contrast, the working machine 1 includes the electric motor 9 as a prime mover, and the rotational driving of the electric cooling fans, such as the radiator fan 35*a* and the like, included in the above-mentioned coolers is independent of the rotational driving of the electric motor 9. The controller 7 controls the rotational driving of the radiator fan 35*a* and the oil cooler fan 37*a*, which are the electric cooling fans, in accordance with the temperature conditions or the like of the cooling targets.

As described above, the electric cooling fans can be controlled depending on the situation so as to, for example, either remain stationary or rotate at low speeds in order to reduce noise. In the working machine 1, the radiator fan 35*a* and the oil cooler fan 37*a*, which serves as the cooling fans, are arranged side by side as illustrated in FIG. 8, and thus, noise reduction is particularly desired.

Accordingly, the working machine 1 according to the present example embodiment employs a control system for electric cooling fans such as that illustrated in FIG. 3, FIG. 4A, FIG. 4B, FIG. 5, FIG. 6A, FIG. 6B and FIG. 6C. This structure will be described below.

In the working machine 1, a cooling-fan rotation characteristic diagram that indicates a control pattern of at least one of the cooling fans is stored in the memory such as the above-mentioned storage unit 7*b*. The cooling-fan rotation characteristic diagram includes a plurality of fan control maps combined together. The plurality of fan control maps are created in accordance with individual situations. In other words, the cooling-fan rotation characteristic diagram is a single map group.

Figure 3:
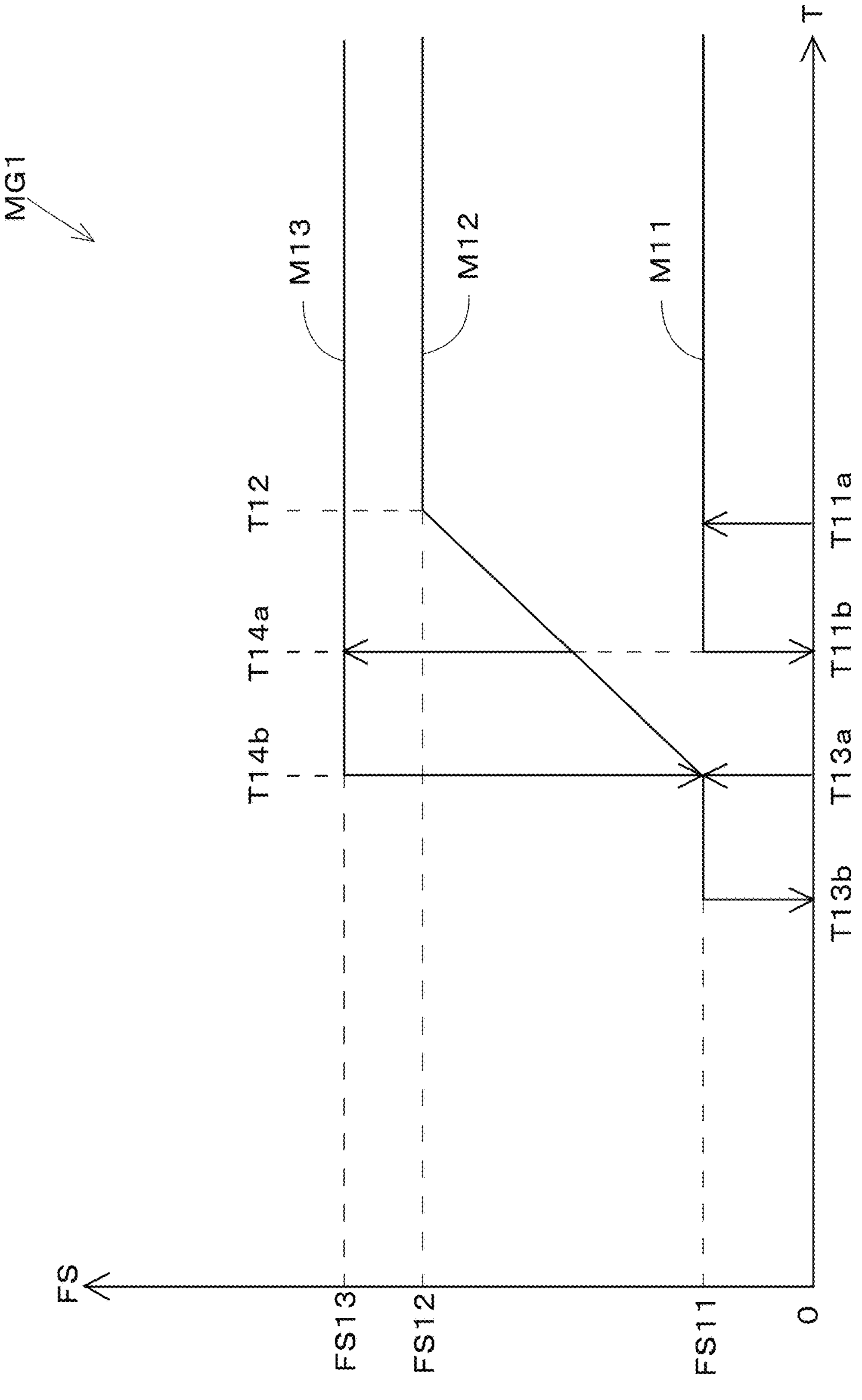
FIG. 3 is a diagram illustrating a first map group.
Figure 5:
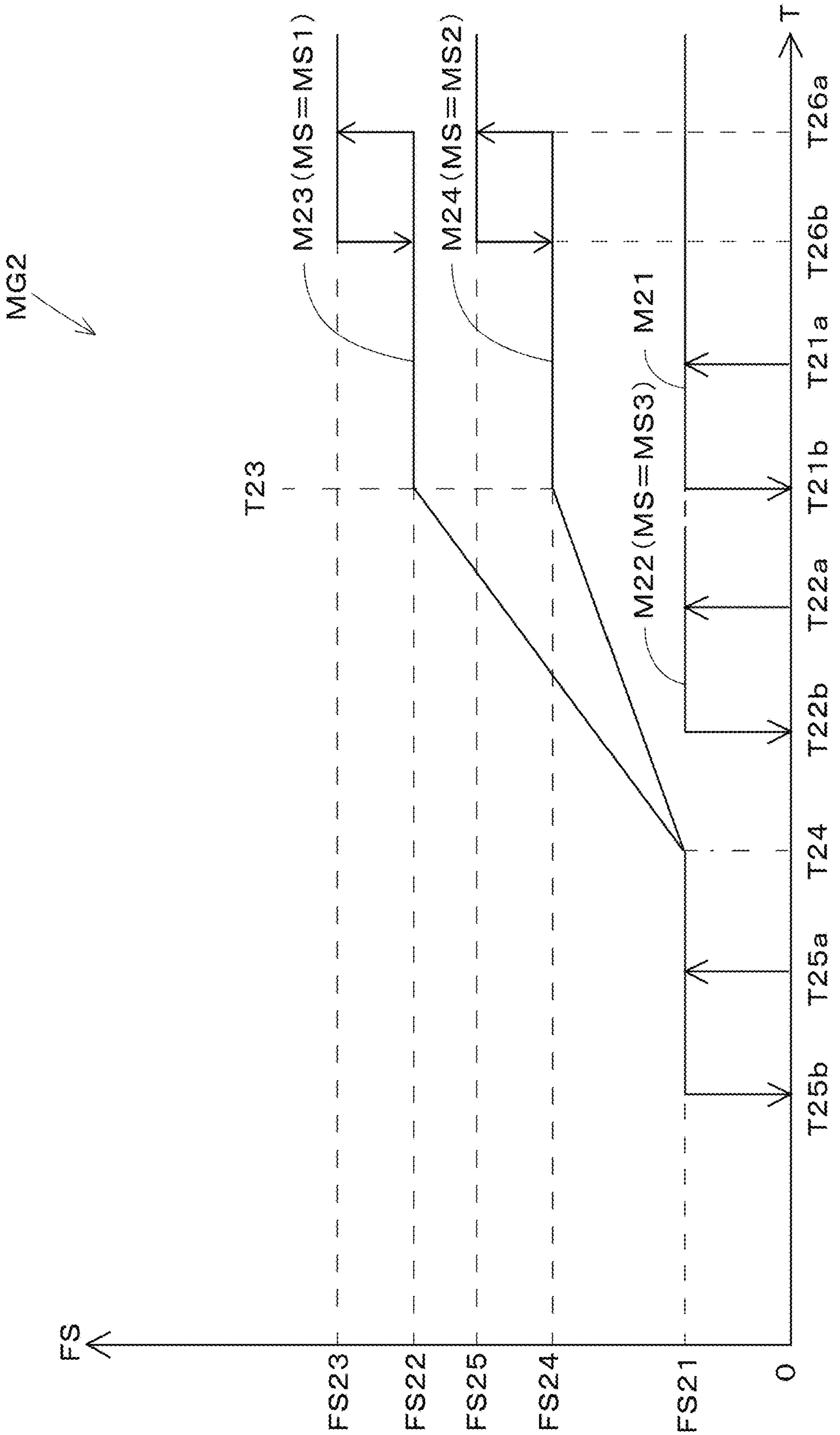
FIG. 5 is a diagram illustrating a second map group.

In the working machine 1 according to the present example embodiment, as such map groups, a first map group MG1 illustrated in FIG. 3 and a second map group MG2 illustrated in FIG. 5 are stored in the memory.

Each of the map groups MG1 and MG2 includes a plurality of fan control maps each indicating a rotational speed characteristic of a corresponding one of the cooling fans with respect to the temperature of the corresponding cooling target (the cooling water, the hydraulic fluid, or the like). In other words, each of the fan control maps is a graph in which the horizontal axis denotes a temperature T of the cooling target (hereinafter referred to as a "cooling target temperature T") as mentioned above and in which the vertical axis denotes a rotational speed FS of the cooling fan (hereinafter referred to as a "fan rotational speed FS").

The first map group MG1 illustrated in FIG. 3 will now be described. The first map group MG1 includes a plurality of fan control maps M11, M12, and M13.

The fan control map M11 is selected when the unloading valve 58 is in the fluid blocking position 58*b* or when the unload lever 5*c* is pulled up to the unload position (raised position) (hereinafter simply referred to as "during unloading").

The fan control map M12 is selected when the unloading valve 58 is in the fluid supplying position 58*a* or when the unload lever 5*c* is lowered to the load position (lowered position) (hereinafter simply referred to as "during loading").

Even during loading, when the AI-SW 48 is brought into the OFF state, that is, when the auto-idling control is performed, the fan control map M11 is selected.

The fan control map M13 is selected when any one of the abnormally-high-temperature detectors 49 included in the high-power equipment (including the electric motor 9) as mentioned above, detects an abnormally high temperature regardless of whether it is during loading or during unloading.

The fan control map M11, which is selected during unloading or when the auto-idling control is performed, indicates that the fan rotational speed FS is a rotational speed FS11 when the cooling target temperature T is equal to or higher than a temperature T11*a*.

The temperature T11*a* is set as a threshold for determining whether to increase the rotational speed FS from zero to the rotational speed FS11. In other words, when the cooling target temperature T increases from a temperature lower than the temperature T11*a* and reaches the temperature T11*a* while the cooling fan is not rotating, the cooling fan starts to rotate at the rotational speed FS11, and the fan rotational speed FS is maintained at the rotational speed FS11 while the temperature further increases.

On the other hand, in the fan control map M11, even when the cooling target temperature T decreases from a temperature more than the temperature T11*a* and reaches the temperature T11*a* while the cooling fan is rotating at the rotational speed FS11, the rotational speed FS11 is maintained, and when the cooling target temperature T further decreases to a temperature T11*b*, the rotation of the cooling fan is stopped.

The temperature T11*b* is a threshold for determining whether to stop the rotation of the cooling fan that is rotating at the rotational speed FS11 (to set the rotational speed to zero), and the temperature T11*b* is lower than the temperature T11*a*.

As described above, by setting the temperature T11*a*, which is the threshold for starting the rotation of the cooling fan (ON), and the temperature T11*b*, which is the threshold for stopping the rotation of the cooling fan (OFF), to be different from each other, it is possible to prevent the cooling fan from reacting too sensitively to a change in the cooling target temperature T and frequently switching between ON and OFF.

The motor rotational speed MS of the electric motor 9 during the auto-idling control is the idle speed MS3 (see FIG. 5). In other words, the rotational speed FS11 is determined in accordance with the rotational driving of the electric motor 9 at the idle speed MS3.

In contrast, during unloading, setting the motor rotational speed MS of the electric motor 9 to the idle speed MS3 or setting the motor rotational speed MS to zero (i.e., stopping the rotation of the electric motor 9) may be considered.

The fan control map M12 that is selected during loading except for the case where the auto-idling control is performed indicates that the fan rotational speed FS is a rotational speed FS12 when the cooling target temperature T is equal to or higher than a temperature T12 and that the fan rotational speed FS increases from the rotational speed FS11 to the rotational speed FS12 as the temperature T increases from a temperature T13*a* that is lower than the temperature T12 to the temperature T12.

The rotational speed FS12 is defined as a rotational speed of each of the cooling fans at which the cooling targets can be cooled when the hydraulic actuators are normally operated to drive the working device 20 and the traveling device 10.

In the fan control map M12, the temperature T13*a* is set as a threshold for determining whether to increase the fan rotational speed FS from zero to the rotational speed FS11. In other words, when the cooling target temperature T increases from a temperature lower than the temperature T13*a* and reaches the temperature T13*a* while the cooling fan is not rotating, the cooling fan starts to rotate at the rotational speed FS11.

As the temperature T increases from the temperature T13*a* to the temperature T12, the fan rotational speed FS increases from the rotational speed FS11 to the rotational speed FS12, and the rotational speed FS12 is maintained while the cooling target temperature T is higher than the temperature T12.

A temperature T13*b* is a threshold for determining whether to stop the rotation of the cooling fan that is rotating at the rotational speed FS11 (to set the rotational speed to zero).

In other words, even when the cooling target temperature T decreases to the temperature T13*a* after the cooling target temperature T has increased to the temperature T13*a* and the cooling fan has started to rotate, the rotation of the cooling fan at a rotational speed FS21 is maintained until the cooling target temperature T decreases to the temperature T13*b* that is lower than the temperature T13*a*.

As described above, by setting the temperature T13*a*, which is the threshold for starting the rotation of the cooling fan (ON), and the temperature T13*b*, which is the threshold for stopping the rotation of the cooling fan (OFF), to be different from each other, it is possible to prevent the cooling fan from reacting too sensitively to a change in the temperature T and frequently switching between ON and OFF.

In the present example embodiment, the temperature T12 that corresponds to the timing at which the fan rotational speed FS increases in accordance with an increase of the cooling target temperature T and reaches the rotational speed FS12 is set to be substantially equal to the temperature T11*a* that corresponds to the timing at which the cooling target temperature T increases and the fan rotational speed FS increases from zero to the rotational speed FS11 on the fan control map M11.

This is an example, and the relationship between the temperature T12 on the fan control map M12 and the temperatures T11*a* and T11*b* on the fan control map M11 is not particularly limited.

The fan control map M13 is set such that the fan rotational speed FS is set to a rotational speed FS13 when the abnormally-high-temperature detector 49 of any of the high-power equipment detects an abnormally high temperature and the cooling target temperature T is equal to or higher than a temperature T14*a*. The rotational speed FS13 is a rotational speed suitable for cooling the high-power equipment that is in an abnormally-high temperature state and recovering the high-power equipment from the abnormally-high temperature state to a normal temperature state and is a rotational speed higher than the rotational speed FS12.

The fan control map M13 indicates that the fan rotational speed FS is a rotational speed on the fan control map M11 or M12 at a stage where the cooling target temperature T is lower than the temperature T14*a*. In other words, the temperature T14*a* is set as a threshold for determining whether to switch the fan control map selected for controlling the rotational driving of the cooling fan from the fan control map M11 or M12, which has been used so far, to the fan control map M13.

In the fan control map M13, a temperature T14*b* that is lower than the temperature T14*a* is set as a threshold for determining whether to decrease the fan rotational speed FS from a rotational speed FS13 to a rotational speed on the fan control map M11 or M12.

In other words, the fan rotational speed FS once increased to the rotational speed FS13 is maintained at the rotational speed FS13 until the cooling target temperature T decreases to the temperature T14*b*, which is lower than the temperature T14*a*. This can avoid a situation in which the cooling target temperature T decreases as soon as the fan rotational speed FS increases to the rotational speed FS13 and in which the fan rotational speed FS quickly decreases to the original rotational speed, so that the high-power equipment can be appropriately cooled.

In the present example embodiment, the temperature T14*a* is set to be higher than the temperature T13*a* and lower than the temperature T12, and the temperature T14*b* is set to be substantially equal to the temperature T13*a*. However, the present invention is not limited to this, and they may be appropriately set in accordance with the characteristics of the high-power equipment, the cooling performances, and the like.

Next, a control flow for one of the cooling fans using the first map group MG1 will be described with reference to FIG. 4A and FIG. 4B.

Figure 4A:
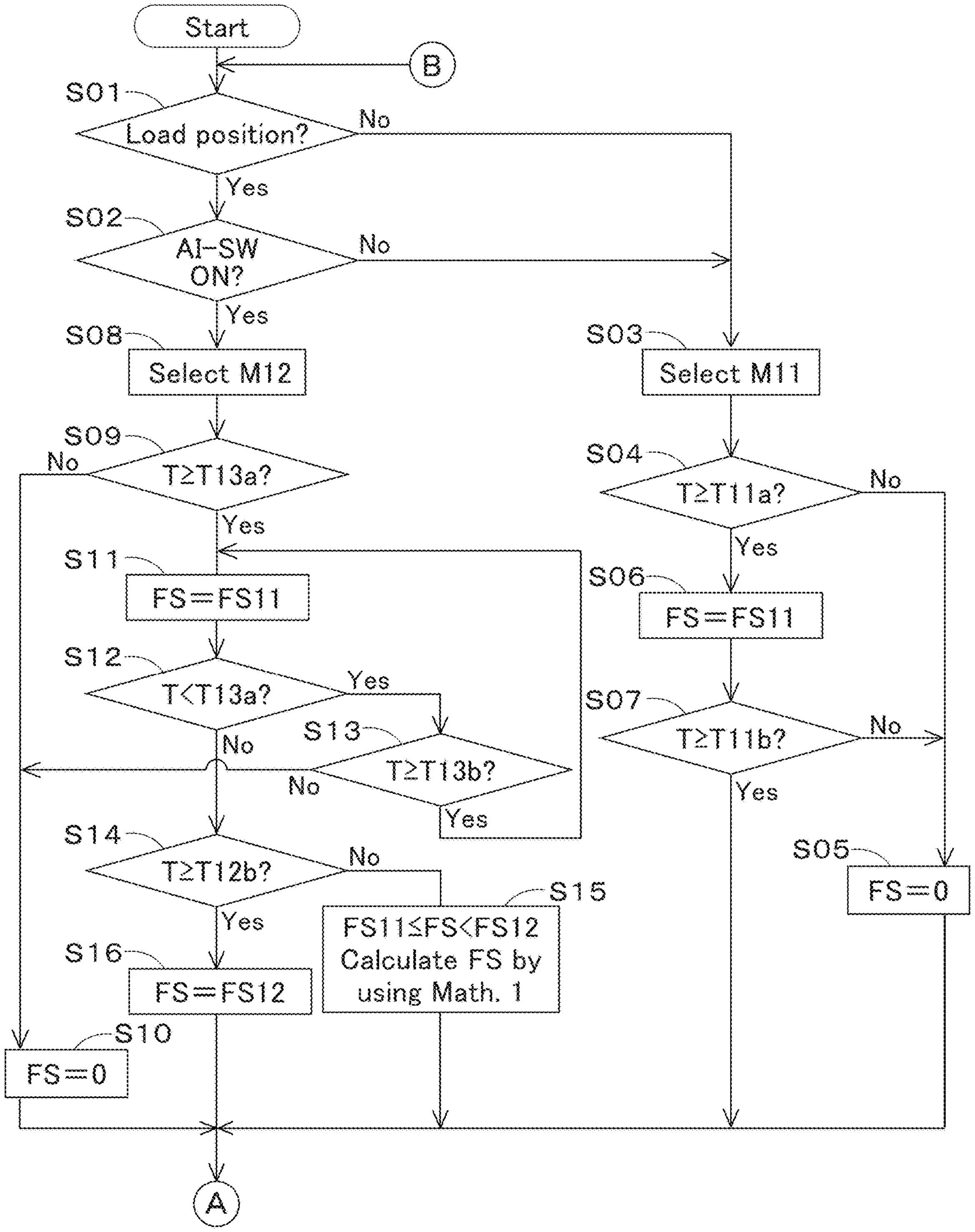
FIG. 4A is a flow chart for controlling a cooling fan based on the first map group.

First, as illustrated in FIG. 4A, it is determined whether the unloading valve 58 is in the fluid supplying position (load position) 58*a* (loaded) or in the fluid blocking position (unload position) 58*b* (unloaded) (step S01). This determination may be replaced with a determination as to whether the unload lever 5*c* is in the load position (lowered position) or in the unload position (raised position) based on detection of the manipulation position of the unload lever 5*c*.

If it is determined that the unloading valve 58 is in the fluid blocking position (unload position) 58*b* (unloaded) (NO in step S01), the controller 7 selects the fan control map M11 from the first map group MG1 stored in the storage unit 7*b* (step S03).

Here, if the cooling target temperature T that is detected by the temperature detector (corresponding to the water temperature detector 46 or the fluid temperature detector 47 illustrated in FIG. 1) is lower than the temperature T11*a* (NO in step S04), the fan rotational speed FS is set to zero (step S05), and if the cooling target temperature T is equal to or higher than the temperature T11*a* (YES in step S04), the fan rotational speed FS is set to the rotational speed FS11. (step S06).

The reason why the fan rotational speed FS is set to a certain value is that the controller 7 issues a command signal to the electric actuator (the fan motors 35*b*, 37*b*, or the like) for driving the corresponding cooling fan and controls the output of the electric actuator so as to adjust the fan rotational speed FS detected by the corresponding fan rotational speed detector (the fan rotational speed detectors 43, 44, or the like) to a target value.

The fan rotational speed FS once increased to the rotational speed FS11 is maintained as long as the cooling target temperature T is equal to or higher than the temperature T11*b* (YES in step S07), and if the temperature T becomes lower than the temperature T11*b* (NO in step S07), the fan rotational speed FS is set to zero (step S05).

If it is determined that the unloading valve 58 is in the fluid supplying position (load position) 58*a* (in a loading state) (YES in step S01), the AI-SW 48 is in the ON state (a state in which the auto-idling control is not performed) or in the OFF state (in a state in which the auto-idling control is performed and the operation device 5 has not been manipulated for a period of time equal to or greater than a certain period of time) (step S02).

If the AI-SW 48 is in the OFF state (NO in step S02), the controller 7 selects the fan control map M11 from the first map group MG1 (step S03), and the rotation of the cooling fan is controlled in a manner similar to that in the case where the unloading valve 58 in the fluid blocking position 58*b*.

If the AI-SW 48 is in the ON state (YES in step S02), the controller 7 selects the fan control map M12 from the first map group MG1 (step S08).

Here, if the cooling target temperature T detected by the above-mentioned temperature detector is lower than the temperature T13*a* (NO in step S09), the fan rotational speed FS is set to zero (step S10). If the cooling target temperature T reaches the temperature T11*a* (YES in step S09), the fan rotational speed FS is increased to the rotational speed FS11 (step S11).

Regarding the fan rotational speed FS once increased to the rotational speed FS11 when the cooling target temperature T reaches the temperature T11*a*, even if the cooling target temperature T falls below the temperature T13*a* thereafter (YES in step S12), the fan rotational speed FS is maintained at the rotational speed FS11 (step S11) as long as the cooling target temperature T is equal to or higher than the temperature T13*b* (YES in step S13), and if the cooling target temperature T becomes lower than the temperature T13*b* (NO in step S13), the fan rotational speed FS is set to zero (step S10).

The value of the fan rotational speed FS that has increased to the rotational speed FS11 when the cooling target temperature T increases and reaches the temperature T13*a* is determined on the basis of the cooling target temperature T that is detected each time.

Here, if the cooling target temperature T is within a range from the temperature T13*a* or higher to lower than the temperature T12 (NO in step S12 and NO in step S14), the cooling fan rotates at the rotational speed FS that is determined in accordance with the value of the temperature T. For example, by substituting the temperature T actually detected into the following formula [Math. 1], the fan rotational speed FS that is equal to or higher than the rotational speed FS11 and lower than the rotational speed FS12 can be obtained (step S15).

[Math. 1]

$$FS=(T-T13a)\times(FS12-FS11)/T12-T13a)+FS11\quad T13a\leq T<T12$$

If the cooling target temperature T is equal to or higher than the temperature T12 (YES in step S14), the fan rotational speed FS is set to the rotational speed FS12 (step S16), and this rotational speed FS12 is maintained as long as the temperature T is maintained at the temperature T12 or higher.

Figure 4B:
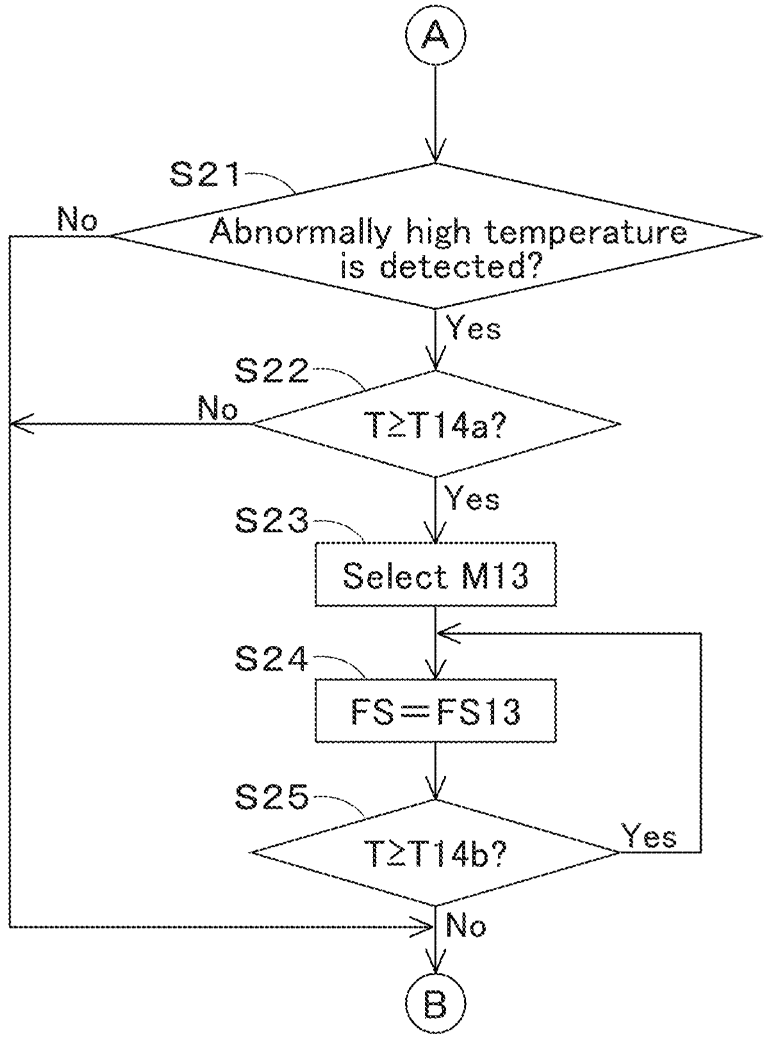
FIG. 4B is a flow chart for controlling the cooling fan based on the first map group.

As described above, in a situation (A) where the fan control map M11 or M12 is selected and where the rotation of the cooling fan is stopped or the cooling fan is rotating at the fan rotational speed FS determined on the basis of the map, as illustrated in FIG. 4B, the abnormally-high-temperature detector 49 of each high-power equipment continuously checks the presence or absence of an abnormally high temperature (step S21).

If the abnormally-high-temperature detector 49 of any of the high-power equipment detects an abnormally high temperature (YES in step S21) and the cooling target temperature T detected by the temperature detector at that time is equal to or higher than the temperature T14*a* (YES in step S22), the fan control map M13 is selected (step S23), and the cooling fan rotates at the rotational speed FS13, which is a high rotational speed so as to achieve removal of the abnormally high temperature from the high-power equipment.

While the cooling target temperature T detected by the temperature detector is equal to or higher than the temperature T14*b* (YES in step S25), the fan continues to rotate at the rotational speed FS13. If the detected cooling target temperature T falls below the temperature T14*b* (NO in step S25), it is determined that the abnormally high temperature has been removed from the high-power equipment, and the control returns to the control of the cooling fan by selecting the fan control map M11 or M12 in accordance with the situation at that time (B). As described above, by controlling the rotational driving of the electric cooling fan by using the first map group MG1, the rotation of the cooling fan can be stopped, or the cooling fan can be caused to rotate at a minimum rotational speed in the case where an increase in the temperature of the cooling target is not a significant concern. Examples of such a case include during unloading, when the auto-idling control is performed, and the like.

Even during loading, if the cooling target temperature T is low, the rotation of the cooling fan can be stopped, or the rotational speed of the cooling fan can be kept low.

As a result, generation of noise due to the rotation of the cooling fan can be suppressed, and power consumption can be reduced. In addition, excessive cooling of the cooling target can be suppressed.

In contrast, when the temperature of the cooling target is high due to the operation of the corresponding hydraulic actuator or the like, the cooling target can be cooled by the rotation of the cooling fan at high rotational speed. In particular, when the high-power equipment has an abnormally high temperature, the abnormally high temperature can be quickly removed from the high-power equipment by increasing the rotational speed of the cooling fan. As a result, a reliable cooling effect can be obtained when the need for cooling the cooling target is high.

In the working machine 1, applying the radiator fan 35*a* as the cooling fan whose rotational driving is controlled by using the first map group MG1 as described above may be considered. In other words, the following may be considered: a cooler to which the control of the rotational driving of the cooling fan is applied is the radiator 35, the cooling target thereof is the cooling water for cooling the high-power equipment including the electric motor 9, and the cooling target temperature T is a cooling water temperature T detected by the water temperature detector 46.

As described above, when the first map group MG1 illustrated in FIG. 3 is used for controlling the rotational driving of the radiator fan 35*a*, for example, setting the rotational speed FS11, the rotational speed FS12, and the rotational speed FS13 to 1000 rpm, 2500 rpm, and 3000 rpm, respectively, may be considered.

For example, the following may also be considered: a cooling water temperature T11 serving as a threshold that is used when the rotational speed FS of the radiator fan 35*a* is increased from zero to the rotational speed FS11 in the fan control map M11 is set to 70° C., the cooling water temperature T13*a* serving as a threshold that is used when the rotational speed FS of the radiator fan 35*a* is increased from zero to the rotational speed FS11 in the fan control map M12 is set to 60° C., the cooling water temperature T12 that corresponds to the timing at which the rotational speed FS of the radiator fan 35*a*, increased from rotation speed FS11, reaches the rotational speed FS12 in the fan control map M12 is set to 70° C., and the cooling water temperature T14*a* that corresponds to the timing at which the rotational speed FS of the radiator fan 35*a* is increased to the rotational speed FS13 in the fan control map M13 is set to 65° C.

Next, the second map group MG2 illustrated in FIG. 5 will be described. The second map group MG2 includes a plurality of fan control maps M21, M22, M23, and M24.

During unloading (when the unloading valve 58 is in the fluid blocking position 58*b*), the fan control map M21 is selected.

Even during loading (in the case where the unloading valve 58 is in the fluid supplying position 58*a*), when the AI-SW 48 is brought into the OFF state, that is, when the auto-idling control is performed, the fan control map M22 is selected.

During loading, except when the auto-idling control is performed, one of the fan control map M23 and the fan control map M24 is selected in accordance with the value to which the motor rotational speed MS of the electric motor 9 is set.

When the electric motor 9 is rotating at the high idle speed MS1, the fan control map M23 is selected. In contrast, when the electric motor 9 is rotating at the low idle speed MS2, the fan control map M24 is selected.

The fan control map M21 that is selected during unloading is set such that, when the cooling target temperature T is lower than a temperature T21*a* in a state where the fan rotational speed FS is zero, the fan rotational speed FS is maintained at zero and such that, when the cooling target temperature T increases from this state to the temperature T21*a*, the fan rotational speed FS is set to the rotational speed FS21.

The fan control map M21 is also set such that, even when the cooling target temperature T decreases after the cooling target temperature T has increased to the temperature T21*a* and the cooling fan has started to rotate, the rotation of the cooling fan is maintained at the rotational speed FS21 until the cooling target temperature T decreases to a temperature T21*b*.

The fan control map M22 that is selected during loading and when the auto-idling control is performed is set such that, when the cooling target temperature T is lower than a temperature T22*a* in a state where the fan rotational speed FS is zero, the fan rotational speed FS is maintained at zero and such that, when the cooling target temperature T increases from this state to the temperature T22*a*, the fan rotational speed FS is set to the rotational speed FS21.

The fan control map M22 is also set such that, even when the cooling target temperature T decreases after the cooling target temperature T has increased to the temperature T22*a* and the cooling fan has started to rotate, the rotation of the cooling fan is maintained at the rotational speed FS21 until the cooling target temperature T decreases to a temperature T22*b*.

The fan control map M23 that is selected when the electric motor 9 is rotating at the high idle speed MS1 during loading (hereinafter simply referred to as "during high idle speed") is set such that, when the cooling target temperature T increases from a temperature lower than a temperature T25*a* and reaches the temperature T25*a* while the cooling fan is not rotating, the cooling fan starts to rotate at the rotational speed FS21 and such that the cooling fan is caused to rotate at the rotational speed FS21 until the cooling target temperature T reaches a temperature T24 or decreases to a temperature T25*b*.

The fan control map M23 is set such that, even when the cooling target temperature T decreases after the cooling target temperature T has increased to the temperature T25*a* and the cooling fan has started to rotate, the rotation of the cooling fan is maintained at the rotational speed FS21 until the cooling target temperature T decreases to the temperature T25*b* and such that, when the cooling target temperature T decreases to the temperature T25*b*, the fan rotational speed FS is set to zero.

The fan control map M23 is also set such that, when the cooling target temperature Tis equal to or higher than the temperature T24 and lower than a temperature T23, the fan rotational speed FS is increased in accordance with an increase in the cooling target temperature T and such that, when the cooling target temperature T is equal to the temperature T23, the fan rotational speed FS is set to a rotational speed FS22.

The fan control map M23 is also set such that, when the cooling target temperature T becomes equal to or higher than the temperature T23, the fan rotational speed FS is maintained at the rotational speed FS22 until the cooling target temperature T further increases and reaches a temperature T26*a*.

The fan control map M23 is set such that, when the cooling target temperature T reaches the temperature T26*a* in the state of the rotational speed FS22, the fan rotational speed FS is increased to a rotational speed FS23 that is higher than the rotational speed FS22 and such that, even if the cooling target temperature T further increases, the fan rotational speed FS is maintained at the rotational speed FS23.

The fan control map M23 is also set such that, after the fan rotational speed FS has been increased to the rotational speed FS22, the fan rotational speed FS is decreased to the rotational speed FS22 when the cooling target temperature T is decreased to a temperature T26*b* that is lower than the temperature T26*a* and higher than the temperature T23.

In the present example embodiment, the temperatures T22*a* and T22*b* that serve as thresholds used for determining whether to set the fan rotational speed FS to zero or the rotational speed FS21 in the fan control map M22, which is selected when the auto-idling control is performed, are set between the temperature T23 and the temperature T24 in the fan control map M23. In other words, the temperature T22*a* is set to be lower than the temperature T23, and the temperature T22*b* is set to be higher than the temperature T24.

In the fan control map M21 that is selected during unloading, the temperature T21*a* that is a threshold for determining whether to increase the fan rotational speed FS from zero to the rotational speed FS21 is set to be higher than the temperature T23 on the fan control map M23. In this case, setting the temperature T21*b* that is a threshold for changing the fan rotational speed FS from the rotational speed FS21 to zero to be substantially equal to the temperature T23 on the fan control map M23 may be considered.

The relationship between the temperature T23 on the fan control map M23 and the temperatures T21*a* and T21*b* on the fan control map M21 or the temperatures T22*a* and T22*b* on the fan control map M22 has been described above as an example and is not particularly limited thereto. For example, the temperature T21*a* or the temperature T22*a* may be set to be substantially equal to the temperature T23 on the fan control map M23.

The fan control map M24 that is selected when the electric motor 9 is rotating at the low idle speed MS2 during loading (hereinafter simply referred to as "during low idle speed") is set such that, when the cooling target temperature T increases from a temperature lower than the temperature T25*a* and reaches the temperature T25*a* while the cooling fan is not rotating, the cooling fan starts to rotate at the rotational speed FS21 and such that the cooling fan is caused to rotate at the rotational speed FS21 until the cooling target temperature T reaches the temperature T24 or decreases to the temperature T25*b*.

The fan control map M24 is set such that, even when the cooling target temperature T decreases after the cooling target temperature T has increased to the temperature T25*a* and the cooling fan has started to rotate, the rotation of the cooling fan is maintained at the rotational speed FS21 until the cooling target temperature T decreases to the temperature T25*b* and such that, when the cooling target temperature T decreases to the temperature T25*b*, the fan rotational speed FS is set to zero.

The fan control map M24 is also set such that, when the cooling target temperature T is equal to or higher than the temperature T24 and lower than the temperature T23, the fan rotational speed FS is increased in accordance with an increase in the cooling target temperature T and such that, when the cooling target temperature T is equal to the temperature T23, the fan rotational speed FS is set to a rotational speed FS24. The rotational speed FS24 is set to be lower than the rotational speed FS22, which has been mentioned above.

The fan control map M24 is set such that the fan rotational speed FS is maintained at the rotational speed FS21 during the period when the cooling target temperature T is increasing from the temperature T25*a* to the temperature T24. The fan control map M24 increases the fan rotational speed FS in accordance with an increase in the cooling target temperature T when the cooling target temperature T is within a range from the temperature T24 to the temperature T23.

The fan control map M24 is set such that, when the cooling target temperature T becomes equal to or higher than the temperature T23, the fan rotational speed FS is maintained at the rotational speed FS24 until the cooling target temperature T further increases and reaches the temperature T26*a*. The fan control map M24 is also set such that, when the cooling target temperature T increases to the temperature T26*a*, the fan rotational speed FS is increased from the rotational speed FS24 to a rotational speed FS25 that is higher than the rotational speed FS24. Even if the cooling target temperature T further increases, the fan rotational speed FS is maintained at the rotational speed FS25.

The fan control map M24 is also set such that the fan rotational speed FS that has increased to the rotational speed FS25 is maintained until the cooling target temperature T decreases to the temperature T26*b*, which is lower than the temperature T26*a*, and such that the fan rotational speed FS is decreased to the rotational speed FS24 when the cooling target temperature T decreases to the temperature T26*b*.

The relationship of the temperatures T23 and T24 on the fan control map M24 with the temperatures T21*a* and 21*b* on the fan control map M21 and with the temperatures T22*a* and T22*b* on the fan control map M22 is similar to the relationship of the temperatures T23 and T24 on the fan control map M23 with the temperatures T21*a*, T21*b*, T22*a*, and T22*b*.

Next, a control flow for one of the cooling fans using the second map group MG2 will be described with reference to FIG. 6A, FIG. 6B, and FIG. 6C.

Figure 6A:
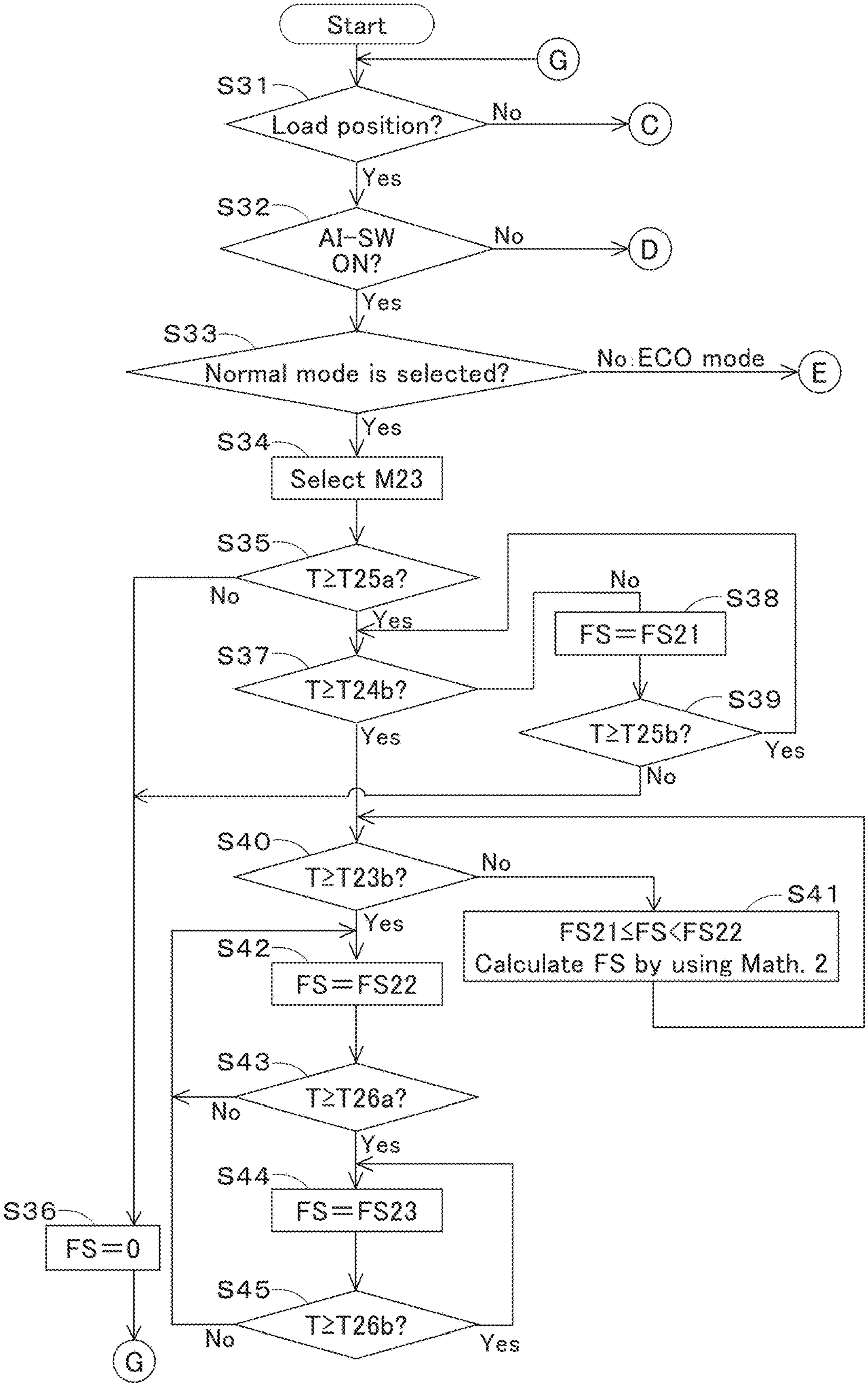
FIG. 6A is a flow chart for controlling the cooling fan based on the second map group.

First, as illustrated in FIG. 6A, it is determined whether the unloading valve 58 is in the fluid supplying position 58*a* (during loading) or in the fluid blocking position 58*b* (during unloading) (step S31). This determination may be replaced with a determination as to whether the unload lever 5*c* is in the load position (lowered position) or in the unload position (raised position) based on detection of the manipulation position of the unload lever 5*c*.

Figure 6B:
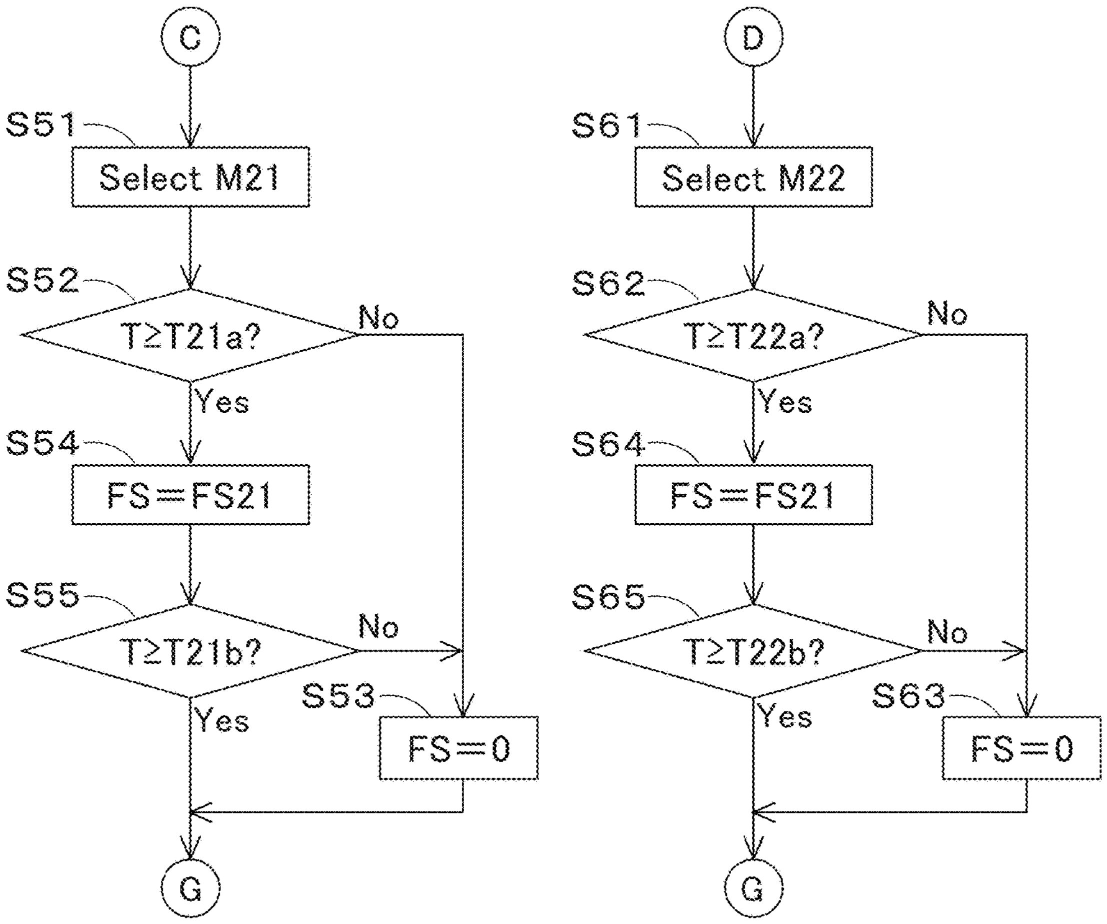
FIG. 6B is a flow chart for controlling the cooling fan based on the second map group.

If it is determined that the unloading valve 58 is in the fluid blocking position 58*b* (during unloading) (NO in step S31), as illustrated in FIG. 6B, the controller 7 selects the fan control map M21 from the second map group MG2 stored in the storage unit 7*b* (step S51).

Here, if the cooling target temperature T that is detected by the temperature detector (corresponding to the water temperature detector 46 or the fluid temperature detector 47 illustrated in FIG. 1) is lower than the temperature T21*a* (NO in step S52), the fan rotational speed FS is set to zero (step S53), and if the cooling target temperature T is equal to or higher than the temperature T21*a* (YES in step S52), the fan rotational speed FS is set to the rotational speed FS21. (step S54).

The fan rotational speed FS once increased to the rotational speed FS21 is maintained as long as the cooling target temperature T is equal to or higher than the temperature T21*b* (YES in step S55), and if the temperature T becomes lower than the temperature T21*b* (NO in step S55), the fan rotational speed FS is set to zero (step S53).

As illustrated in FIG. 6A, if it is determined that the unloading valve 58 is in the fluid supplying position 58*a* (during loading) (YES in step S31), the AI-SW 48 is in the ON state (a state in which the auto-idling control is not performed) or in the OFF state (a state in which the auto-idling control is performed). It is determined whether the operation device 5 (the operation levers 5*a* or 5*b*) has not been manipulated for a period of time equal to or greater than a certain period of time (step S32).

If the AI-SW 48 is in the OFF state (NO in step S32), as illustrated in FIG. 6B, the controller 7 selects the fan control map M22 from the second map group MG1 (step S61) and controls the rotational driving of the cooling fan on the basis of the fan control map M22.

Here, if the cooling target temperature T detected by the temperature detector is lower than the temperature T22*a* (NO in step S62), the fan rotational speed FS is set to zero (step S63), and if the cooling target temperature T is equal to or higher than the temperature T21*a* (YES in step S62), the fan rotational speed FS is set to the rotational speed FS21. (step S64).

The fan rotational speed FS once increased to the rotational speed FS21 is maintained as long as the cooling target temperature T is equal to or higher than the temperature T22*b* (NO in step S65), and if the cooling target temperature T becomes lower than the temperature T22*b* (YES in step S65), the fan rotational speed FS is set to zero (step S63).

If the AI-SW 48 is in the ON state (YES in step S32), it is determined whether the normal mode (in which the electric motor 9 rotates at the high idle speed MS1) or the ECO mode (in which the electric motor 9 rotates at the low idle speed MS2) is selected by the mode selection SW 5*e* (step S33).

Instead of this determination of the mode selection (step S33), it may be determined whether the actual motor rotational speed MS of the electric motor 9 detected by the motor rotational speed detector 42 is set to the high idle speed MS1 or the low idle speed MS2.

If the normal mode is selected (the motor rotational speed MS is set to the high idle speed MS1) (YES in step S33), the controller 7 selects the fan control map M23 from the second map group MG2 (step S34).

Here, if the cooling target temperature T detected by the above-mentioned temperature detector is lower than the temperature T25*a* (NO in step S35), the fan rotational speed FS is set to zero (step S36). If the cooling target temperature T reaches the temperature T25*a* (YES in step S35), the fan rotational speed FS is increased to the rotational speed FS21, and the fan rotational speed FS is set to the rotational speed FS21 (step S38) until the cooling target temperature T increases to the temperature T24 (NO in step S37).

Regarding the fan rotational speed FS once increased to the rotational speed FS21 when the cooling target temperature T reaches the temperature T25*a*, even if the cooling target temperature T decreases thereafter, the fan rotational speed FS is maintained at the rotational speed FS21 (step S38) as long as the cooling target temperature T is equal to or higher than the temperature T25*b* (YES in step S39), and if the temperature T becomes lower than the temperature T25*b* (NO in step S39), the fan rotational speed FS is set to zero (step S36).

If the cooling target temperature T is within a range from the temperature T24 or higher to lower than the temperature T23 (YES in step S37 and NO in step S40), the cooling fan rotates at the rotational speed FS that is determined in accordance with the value of the temperature T. For example, by substituting the temperature T actually detected into the following formula [Math. 2], the fan rotational speed FS can be obtained (step S41).

[Math. 2]

$$FS=(T-T24)\times(FS22-FS21)/T23-T24)+FS21\quad T24\le T<T23$$

If the cooling target temperature T is equal to or higher than the temperature T23 (YES in step S40) and is lower than the temperature T26*a* (NO in step S43), the fan rotational speed FS is set to the rotational speed FS22 (step S44).

If the cooling target temperature T becomes equal to or higher than the temperature T26*a* (YES in step S43), the fan rotational speed FS is increased to the rotational speed FS23 (step S44).

Regarding the fan rotational speed FS once increased to the rotational speed FS23 when the cooling target temperature T reaches the temperature T26*a*, even if the cooling target temperature T decreases thereafter, the fan rotational speed FS is maintained at the rotational speed FS23 (step S44) as long as the cooling target temperature T is equal to or higher than the temperature T26*b* (YES in step S45), and if the temperature T becomes lower than the temperature T26*b* (YES in step S45), the fan rotational speed FS is set to the rotational speed FS22 (step S42).

Figure 6C:
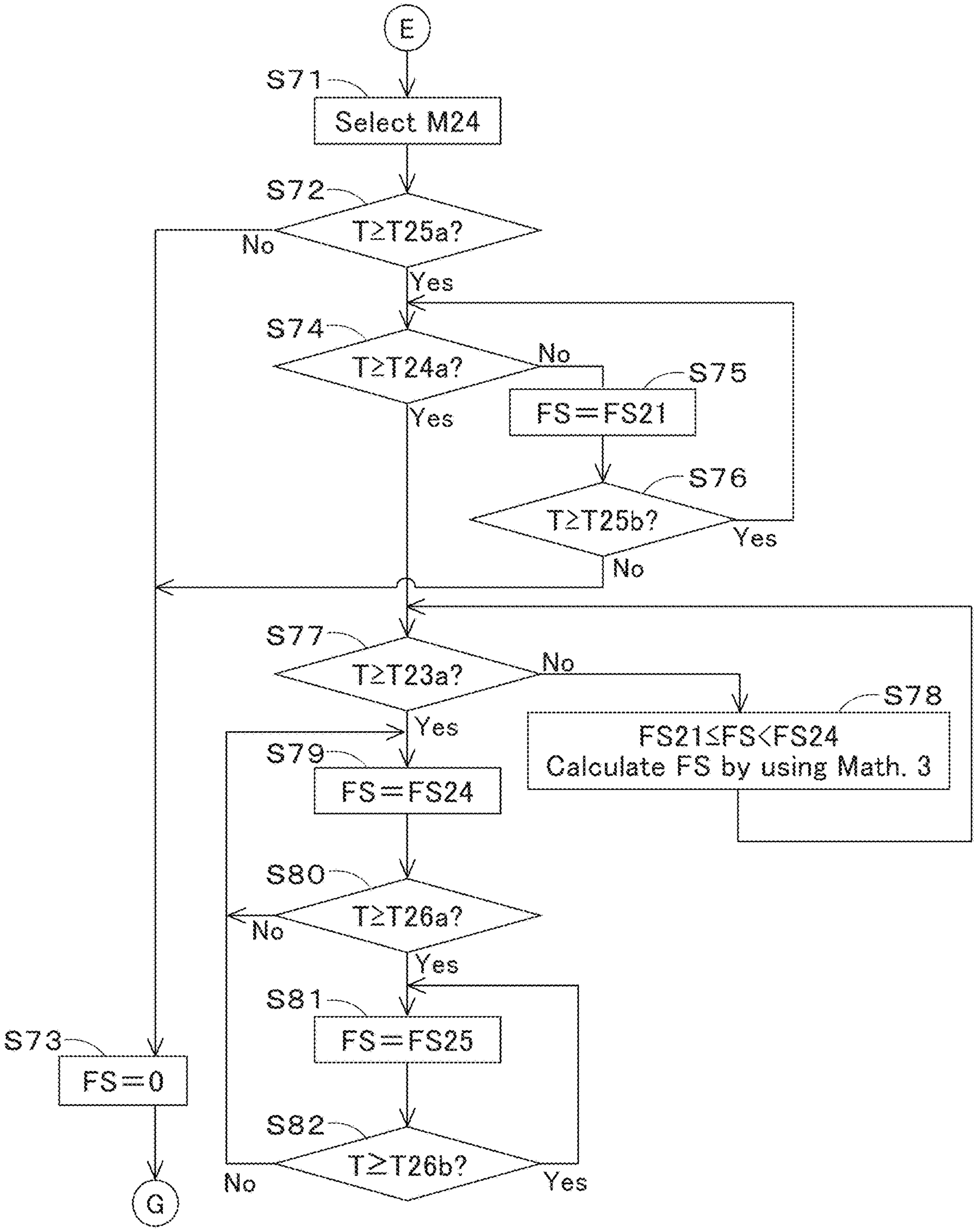
FIG. 6C is a flow chart for controlling the cooling fan based on the second map group.

If during loading (YES in step S31), the AI-SW 48 is in the ON state (YES in step S32), and the ECO mode is selected by the operation of the mode selection SW5*e*, that is, if the motor rotational speed MS of the electric motor 9 is set to the low idle speed MS2 (NO in step S33), the controller 7 selects the fan control map M24 from the second map group MG2 as illustrated in FIG. 6C (step S71).

Here, if the cooling target temperature T detected by the above-mentioned temperature detector is lower than the temperature T25*a* (NO in step S72), the fan rotational speed FS is set to zero (step S73). If the cooling target temperature T reaches the temperature T25*a* (YES in step S72), the fan rotational speed FS is increased to the rotational speed FS21, and the fan rotational speed FS is set to the rotational speed FS21 (step S75) until the cooling target temperature T increases to the temperature T24 (NO in step S74).

Regarding the fan rotational speed FS once increased to the rotational speed FS21 when the cooling target temperature T reaches the temperature T25*a*, even if the cooling target temperature T decreases thereafter, the fan rotational speed FS is maintained at the rotational speed FS21 (step S75) as long as the cooling target temperature T is equal to or higher than the temperature T25*b* (YES in step S76), and if the temperature T becomes lower than the temperature T25*b* (NO in step S76), the fan rotational speed FS is set to zero (step S73).

If the cooling target temperature T is within a range from the temperature T24 or higher to lower than the temperature T23 (YES in step S74 and NO in step S77), the cooling fan rotates at the rotational speed FS that is determined in accordance with the value of the temperature T. For example, by substituting the temperature T actually detected into the following formula [Math. 3], the fan rotational speed FS can be obtained (step S78).

[Math. 3]

$$FS=(T-T24)\times(FS24-FS21)/T23-T24)+FS21\quad T24\le T<T23$$

If the cooling target temperature T is equal to or higher than the temperature T23 (YES in step S77) and is lower than the temperature T26*a* (NO in step S80), the fan rotational speed FS is set to the rotational speed FS24 (step S79).

If the cooling target temperature T becomes equal to or higher than the temperature T26*a* (YES in step S80), the fan rotational speed FS is increased to the rotational speed FS25 (step S81).

Regarding the fan rotational speed FS once increased to the rotational speed FS25 when the cooling target temperature T reaches the temperature T26*a*, even if the cooling target temperature T decreases thereafter, the fan rotational speed FS is maintained at the rotational speed FS25 (step S81) as long as the cooling target temperature T is equal to or higher than the temperature T26*b* (YES in step S82), and if the temperature T becomes lower than the temperature T26*b* (YES in step S82), the fan rotational speed FS is set to the rotational speed FS24 (step S79).

As described above, by controlling the rotational driving of the electric cooling fan by using the second map group MG2, the rotation of the cooling fan can be stopped, or the cooling fan can be caused to rotate at a minimum rotational speed in the case where an increase in the temperature of the cooling target is not a significant concern. Examples of such a case include during unloading, when the auto-idling control is performed, and the like.

Even during loading, if the cooling target temperature is low, the rotation of the cooling fan can be stopped, or the rotational speed of the cooling fan can be kept low. Even if the cooling target temperature is high, the rotational speed of the cooling fan can be kept low during low idle speed.

As a result, generation of noise due to the rotation of the cooling fan can be suppressed, and power consumption can be reduced. In addition, excessive cooling of the cooling target can be suppressed.

In contrast, when the temperature of the cooling target is high due to the operation of the corresponding hydraulic actuator or the like, the cooling target can be cooled by the rotation of the cooling fan at high rotational speed. In particular, when the cooling target temperature is very high, the rotational speed of the cooling fan can be increased both during high idle speed and during low idle speed so as to quickly bring the cooling target out of an abnormally-high temperature state, and a reliable cooling effect can be obtained.

In the working machine 1, applying the oil cooler fan 37*a* as the cooling fan whose rotational driving is controlled by using the second map group MG1 as described above may be considered. In other words, the following may be considered: a cooler to which the control of the rotational driving of the cooling fan is applied is the oil cooler 37, the cooling target thereof is the hydraulic fluid discharged from the hydraulic pumps P1 and P2, which are driven by the electric motor 9, toward the hydraulic actuators, and the cooling target temperature T is a hydraulic fluid temperature T detected by the fluid temperature detector 47.

As described above, when the second map group MG1 illustrated in FIG. 5 is used for controlling the rotational driving of the oil cooler fan 37*a*, for example, setting the rotational speed FS21, the rotational speed FS22, the rotational speed FS23, the rotational speed FS24, and the rotational speed FS25 to 1000 rpm, 3000 rpm, 3500 rpm, 1500 rpm, and 2000 rpm respectively, may be considered.

For example, the following may also be considered: the hydraulic fluid temperature T21*a* serving as a threshold that is used when the rotational speed FS of the oil cooler fan 37*a* is increased from zero to the rotational speed FS21 in the fan control map M21 is set to 90° C., the hydraulic fluid temperature T22*a* serving as a threshold that is used when the rotational speed FS of the oil cooler fan 37*a* is increased from zero to the rotational speed FS21 in the fan control map M22 is set to 80° C., the hydraulic fluid temperature T25*a* serving as a threshold that is used when the rotational speed FS of the oil cooler fan 37*a* is increased from zero to the rotational speed FS21 in the fan control maps M23 and M24 is set to 60° C., the temperature T23 that corresponds to the timing at which the rotational speed FS of the oil cooler fan 37*a*, increased from rotation speed FS21, reaches the rotational speeds FS22 and FS24 in the fan control maps M23 and M24 is set to 85° C., and the temperature T26*a* that corresponds to the timing at which the rotational speed FS of the oil cooler fan 37*a* is increased from the rotational speeds FS22 and FS24 to the rotational speeds FS23 and FS25 in the fan control maps M23 and M24 is set to 100° C.

A change in the rotational speed of the electric motor 9 leads to a change in the delivery flow rate of the hydraulic pumps P1 and P2, and the result appears as a change in the temperature of the hydraulic fluid. Thus, for the control of the oil cooler fan 37*a*, it is effective to employ the second map group MG2 that provides the plurality of fan control maps M22 and M24 in accordance with variations in the rotational speed of the electric motor 9.

In contrast, the absorbed torque of each of the hydraulic pumps P1 and P2 is constant regardless of a change in the rotational speed of the electric motor 9, and thus, the amount of heat generated by the electric motor 9 itself does not change much during both low-speed rotation and high-speed rotation. Consequently, regarding the radiator 35 whose cooling target is the cooling water that is used for cooling the electrical equipment, such as the electric motor 9 and the like, the cooling water temperature T is not significantly affected by a change in the rotational speed of the electric motor 9, unlike the hydraulic pumps P1 and P2. Therefore, in the present example embodiment, the first map group MG1 that provides the fan control map M12 created without considering variations in the rotational speed of the electric motor 9 is employed for the control of the radiator fan 35*a*.

Although an application example of the cooling fan has been described above, even in the control of the radiator fan 35*a*, in a situation where a change in the rotational speed of the electric motor 9 needs to be taken into account, a map group that provides, like the second map group MG2, a plurality of fan control maps in accordance with variations in the motor rotational speed MS may be employed. Even in the control of the oil cooler fan 37*a*, in the case where there is only one rotational speed set as the rotational speed of the electric motor 9, a map group that provides, like the first map group MG1, that provides a uniform fan control map without considering a change in the motor rotational speed MS.

As described above, the controller 7 in the working machine 1 according to the present example embodiment selects any one of the plurality of fan control maps indicating the characteristics of the fan rotational speed FS with respect to the cooling target temperature T, depending on whether it is during loading or during unloading so as to vary the characteristics of the fan rotational speed that appear from the control of the cooling fan in each case. This is a minimum control that is to be performed by the controller 7 according to the present example embodiment, and there are no other limitations.

For example, the cooling fans to be controlled may be fans other than the radiator fan 35*a* and the oil cooler fan 37*a*. Even if the first map group MG1 is basically employed, some of the features found in the second map group MG2 may be employed. An example of the features may be providing a map different from the fan control map M11, which is used during unloading, when the auto-idling control is performed. Conversely, even if the second map group MG2 is basically employed, some of the features found in the first map group MG1 may be employed. An example of the features may be adding a map such as the fan control map M13 for cooling in emergencies.

As described above, a working machine 1 includes an electric motor 9, a working device to be driven by power of the electric motor 9, an operation device 5 (operation lever 5*a*, 5*b*) to operate the working device, an operation locker (unload lever 5*c*), a cooler (radiator 35, oil cooler 37) including an electric cooling fan (radiator fan 35*a*, oil cooler fan 37*a*), a temperature detector (water temperature detector 46, fluid temperature detector 47) to detect a cooling target temperature T that is a temperature of a cooling target (cooling water, hydraulic fluid) to be cooled by the cooler (radiator 35, oil cooler 37), and a controller 7 to control a fan rotational speed FS that is a rotational speed of the cooling fan (radiator fan 35*a*, oil cooler fan 37*a*) in accordance with the cooling target temperature T (of cooling water, of hydraulic fluid) detected by the temperature detector (water temperature detector 46, fluid temperature detector 47). The operation locker (unload lever 5*c*) is switchable between an enabling position (load position) where an operation of the working device by the operation device 5 (operation lever 5*a*, 5*b*) is enabled and a disabling position (unload position) where the operation of the working device by the operation device 5 (operation lever 5*a*, 5*b*) is disabled. The controller 7 is configured or programmed to change a characteristic of the fan rotational speed FS with respect to the cooling target temperature T depending on whether the operation locker (unload lever 5*c*) is in the enabling position (load position) or the disabling position (unload position).

With the above-described configuration, the control of rotational driving of the cooling fan (radiator fan 35*a*, oil cooler fan 37*a*) according to the cooling target temperature T can vary between when the operation locker (unload lever 5*c*) is in the enabling position (load position) and when the operation locker (unload lever 5*c*) is in the disabling position (unload position), and for each case, an appropriate rotational state of the cooling fan (radiator fan 35*a*, oil cooler fan 37*a*) can be achieved. Therefore, even in a situation of the cooling target temperature T at which the cooling fan (radiator fan 35*a*, oil cooler fan 37*a*) needs to be rotated at a high speed when the operation locker (unload lever 5*c*) is set to be located in the enabling position (load position), when the operation locker (unload lever 5*c*) is set to be located in the disabling position (unload position), the rotation of the cooling fan (radiator fan 35*a*, oil cooler fan 37*a*) can be stopped, or the cooling fan (radiator fan 35*a*, oil cooler fan 37*a*) can be caused to rotate at a low speed, so that suitable noise reduction, power consumption reduction, and prevention of excessive cooling can be achieved.

The working machine 1 includes a memory (storage unit 7*b*) to store a plurality of fan control maps M11, M12, M13, M21, M22, M23, and M24 each indicating a characteristic of the fan rotational speed FS with respect to the cooling target temperature T. The plurality of fan control maps include a first map M11, M21 and a second map M12, M23 that are different from each other. The controller 7 is configured or programmed to control rotational driving of the cooling fan (radiator fan 35*a*, oil cooler fan 37*a*) based on the first map M11, M21 when the operation locker (unload lever 5*c*) is in the disabling position (unload position), and to control the rotational driving of the cooling fan (radiator fan 35*a*, oil cooler fan 37*a*) based on the second map M12, M23 when the operation locker (the unload lever 5*c*) is in the enabling position (load position).

As described above, by storing the plurality of fan control maps, it is possible to exhibit various fan rotational speed characteristics corresponding to the number of the stored maps, enabling for detailed control of the rotational driving of the cooling fans according to the temperature conditions of the cooling targets and the like. By storing the first map M11, M21 and the second map M12, M23 different from each other and controlling the rotational driving of the cooling fan by using these maps depending on whether the operation locker (unload lever 5*c*) is in the enabling position (load position) or in the disabling position (unload position), it is possible to exhibit different fan rotational speed characteristics in respective cases.

The first map M11, M21 is configured to switch the fan rotational speed FS between zero and a predetermined first fan rotational speed FS11, FS21 in accordance with the cooling target temperature T.

As a result, when the operation locker (unload lever 5*c*) is in the disabling position (unload position) (during unloading), by stopping the rotation of the cooling fan (the radiator fan 35*a*, oil cooler fan 37*a*), generation of noise due to the rotation of the fan can be suppressed, and excessive cooling can also be suppressed. Although the cooling fan is caused to rotate only when the cooling target temperature T becomes a high temperature that is equal to or higher than a first temperature T11*a*, T21*a* and cooling is required, also in this case, by setting the first fan rotational speed FS11, FS21 to a low value, the cooling fan rotates at a low speed, so that the noise can be reduced.

The first map M11, M21 is configured to switch the fan rotational speed FS to the first fan rotational speed FS11 when the cooling target temperature T increases from a temperature lower than a predetermined first rotation increase temperature T11*a*, T21*a* to the first rotation increase temperature T11*a*, T21*a* in a state where the fan rotational speed FS is zero, and to switch the fan rotational speed FS to zero when the cooling target temperature T decreases to a predetermined first rotation decrease temperature T11*b*, T21*b* lower than the first rotation increase temperature T11*a*, T21*a* in a state where the fan rotational speed FS is set to the fan rotational speed FS11.

In this manner, by setting the first rotation decrease temperature T11*b*, T21*b* for stopping the rotation of the cooling fan (OFF) to be lower than the first rotation increase temperature T11*a*, T21*a* for starting the rotation of the cooling fan (ON), it is possible to prevent the cooling fan from reacting too sensitively to a change in the temperature T and frequently switching between ON and OFF.

The second map M12, M23, M24 is configured to set the fan rotational speed FS to a value greater than zero when the cooling target temperature T increases from a temperature lower than a predetermined second rotation increase temperature T13*a*, T25*a* to the second rotation increase temperature T13*a*, T25*a* in a state where the fan rotational speed FS is zero, to set the fan rotational speed FS to a predetermined second fan rotational speed FS12, FS22, FS24 when the cooling target temperature T is equal to or higher than a first specified temperature T12, T23 that is set to be higher than the second rotation increase temperature T13*a*, T25*a*, to set the fan rotational speed FS to become higher, within a range below the second fan rotational speed FS12, FS22, F24, as the cooling target temperature T increases when the cooling target temperature T is equal to or higher than the second rotation increase temperature T13*a*, T25*a* and lower than the first specified temperature T12, T23, and to reduce the fan rotational speed FS to zero when the cooling target temperature T decreases to a predetermined second rotation decrease temperature T13*b*, T25*b* lower than the second rotation increase temperature T13*a*, T25*a* in a state where the fan rotational speed FS is not zero.

As a result, when the operation locker (unload lever 5*c*) is in the enabling position (load position) (during loading), the rotational speed of the cooling fan is set to the second fan rotational speed FS12, FS22, FS24 within a range of the expected cooling target temperature T during normal operation of the working device, so that a reliable cooling effect can be obtained. On the other hand, the noise can be reduced by reducing the rotational speed at a stage where the cooling target temperature T is low. In a transitional range from a stage where the cooling target temperature T is low to a stage where the cooling target temperature T is high, the fan rotational speed FS increases (gradually) to the second fan rotational speed FS12, FS22, FS24 as the temperature increases, and thus, while ensuring a cooling effect appropriate for the temperature condition, it is possible to prevent a sudden change in the fan rotational speed FS and to eliminate a situation where the noise condition changes abruptly (e.g., sudden generation of loud noise).

The second map M12, M23, M24 is configured to set the fan rotational speed FS to a fixed value FS11, FS21 less than the second fan rotational speed FS12, FS22, FS24 when the cooling target temperature T is lower than a second specified temperature T13*a*, T24 that is set to be equal to or higher than the second rotation increase temperature T13*a*, T25*a* and to be lower than the first specified temperature T12, T23, and to set the fan rotational speed FS to become higher, within a range below the second fan rotational speed FS12, FS22, FS24, as the cooling target temperature T increases when the cooling target temperature T is equal to or higher than the second specified temperature T13*a*, T24 and lower than the first specified temperature T12, T23.

As a result, until the cooling target temperature T increases to the second specified temperature T13*a*, T24, the generation of noise and the occurrence of excessive cooling can be prevented by stopping the cooling fan. In contrast, after the cooling target temperature T has reached the second specified temperature T13*a*, T24 and the cooling fan has started to rotate, the rotation of the cooling fan at the fixed fan rotational speed FS11, FS21 is maintained until the cooling target temperature T falls to the third specified temperature T13*b*, T25*b*. After the cooling target temperature T has become lower than the third specified temperature T13*b*, T25*b* and the cooling fan has stopped rotating, the cooling fan is maintained in a non-operating state until the cooling target temperature T increases to the second specified temperature T13*a*, T24. Thus, it is possible to prevent the cooling fan from reacting too sensitively to a change in the temperature T and frequently switching between ON and OFF.

The plurality of fan control maps include a third map M11, M22. The controller 7 is configured or programmed to set a rotational speed MS of the electric motor 9 to an idle speed MS3, and control the cooling fan based on the third map M11, M22 when the operation locker (the unload lever 5*c*) is in the enabling position (load position) and the operation device 5 (working operation lever 5*a*, traveling operation lever 5*b*) is not operated for a certain period of time. The third map M11, M22 is configured to switch the fan rotational speed FS to a predetermined auto-idle speed FS11, FS21 when the cooling target temperature T increases from a temperature lower than a predetermined third rotation increase temperature T11*a*, T22*a* to the third rotation increase temperature T11*a*, T22*a* in a state where the fan rotational speed FS is zero, and to switch the fan rotational speed FS to zero when the cooling target temperature T decreases to a predetermined third rotation decrease temperature T11*b*, T22*b* lower than the third increase temperature T11*a*, T22*a* in a state where the fan rotational speed FS is set to the auto-idle speed FS11, FS21.

As a result, at least a cooling-fan rotation characteristic that is different from that of the second maps M12, M23, M24 that takes into account the second fan rotational speeds FS12, FS23, FS24, which is high fan rotational speeds, and thus, it also becomes possible to exhibit a cooling-fan rotation characteristic that is suitable for a situation where a cooling target does not require much cooling because the working device is not operating during the period when the auto-idling control is performed.

The third map M11 is common with the first map M11.

As a result, even in a state where the operation locker (unload lever 5*c*) is in the enabling position (load position) (during loading), when the auto-idling control is performed, it is possible to exhibit a cooling-fan rotation characteristic that is the same as that exhibited when the operation locker (unload lever 5*c*) is in the disabling position (unload position) (during unloading), and as during unloading, advantageous effects such as noise reduction, prevention of excessive cooling, and the like can be obtained.

The cooling target of the cooler (radiator 35, oil cooler 37) is a refrigerant that is used to cool cooling target equipment (electric motor 9 and/or the like) included in the working machine 1, and the working machine 1 includes an abnormally-high-temperature detector 49 to detect an abnormally high temperature of the cooling target equipment (electric motor 9 and/or the like). The controller 7 is configured or programmed to rotate at a third fan rotational speed FS13 higher than the second fan rotational speed FS12 when the abnormally-high-temperature detector 49 detects an abnormally high temperature and the cooling target temperature T is equal to or higher than a third specified temperature T14*a* that is set to be equal to or higher than the second rotation increase temperature T13*a*.

As a result, even in a state where the rotational speed of the cooling fan is controlled in accordance with the temperature conditions during loading, if an abnormally high temperature of the cooling target equipment, which is high-power equipment such as the electric motor 9 and/or the like, is detected, the cooling fan can rotate at the third fan rotational speed FS13, which is higher than the second fan rotational speed FS12, allowing the refrigerant to be quickly and strongly cooled in order to prioritize the cooling of the cooling target equipment, thereby preventing a failure of the cooling target equipment.

The controller 7 is configured or programmed to cause control of the rotational speed of the cooling fan to return to control based on the second map M12 when the cooling target temperature T decreases to the fourth specified temperature T14*b* that is lower than the third specified temperature T14*a* in a state where the cooling fan is rotating at the third fan rotational speed FS13.

This can avoid a situation in which the cooling target temperature T decreases as soon as the fan rotational speed FS increases to the third fan rotational speed FS13 and in which the fan rotational speed FS quickly decreases to the original rotational speed and ensure a sufficient and reliable cooling effect for the cooling target equipment (the electric motor 9 and/or the like) by the rotation of the cooling fan at the third fan rotational speed FS13.

The second map M23, M24 is configured to set the fan rotational speed FS to a fourth fan rotational speed FS23, FS25 that are higher than the second fan rotational speed FS22, FS24 when the cooling target temperature T increases to a fourth rotation increase temperature T26*a* that is higher than the first specified temperature T23 in a state where the fan rotational speed FS is set to the second fan rotational speed FS22, FS24, and to reduce the fan rotational speed FS to the second fan rotational speed FS22, FS24 when the cooling target temperature T decreases to a predetermined fourth rotation decrease temperature T26*b* that is lower than the fourth rotation increase temperature T26*a* and higher than the first specified temperature T23 in a state where the fan rotational speed FS is set to the fourth fan rotational speed FS23, FS25.

As a result, when the cooling target temperature T becomes a very high temperature equal to or higher than the fourth rotation increase temperature T26*a*, the fan rotational speed FS is immediately increased to the fourth fan rotational speed F23, F25, that is, the rotational speed of the cooling fan is increased, so that the cooling target can be quickly brought out of such a high temperature state. This can also avoid a situation in which the cooling target temperature T decreases as soon as the fan rotational speed FS increases to the fourth fan rotational speed FS23, FS25 and in which the fan rotational speed FS quickly decreases to the original rotational speed and ensure a sufficient and reliable cooling effect for the cooling target that is in the high temperature state.

The plurality of fan control maps includes a fourth map M24. The fourth map M24 is configured to set the fan rotational speed FS to a value greater than zero when the cooling target temperature T increases from a temperature lower than the second rotation increase temperature T25*a* to the second rotation increase temperature T25*a* in a state where the fan rotational speed FS is zero, to set the fan rotational speed FS to a predetermined fifth fan rotational speed FS24 that is lower than the second fan rotational speed FS22 when the cooling target temperature Tis equal to or higher than the first specified temperature T23, to set the fan rotational speed FS to become higher, within a range below the fifth fan rotational speed FS24, as the cooling target temperature T increases when the cooling target temperature T is equal to or higher than the second rotation increase temperature T25*a* and lower than the first specified temperature T23, and to reduce the fan rotational speed FS to zero when the cooling target temperature T decreases to the second rotation decrease temperature T25*b* in a state where the fan rotational speed FS is not zero. The controller 7 is configured or programmed to control the cooling fan based on the second map M23 when a rotational speed MS of the electric motor 9 is set to a high value MS1, and to control the cooling fan based on the fourth map M24 when the rotational speed MS of the electric motor 9 is set to a low value MS2.

As a result, the characteristic of the fan rotational speed FS with respect to the cooling target temperature T can vary between when the electric motor 9 rotates (hereinafter simply referred to as "during motor rotation") at the high rotational speed MS1 and during motor rotation at the low rotational speed MS2, so that it is possible to exhibit a cooling-fan rotation characteristic that is appropriate for the temperature condition of the cooling target and that is exhibited by the motor rotation at each motor rotational speed. In other words, the fourth map M24 employs, in accordance with the temperature condition of the cooling target during motor rotation at the low rotational speed MS2, a rotation characteristic in which the fan rotational speed FS changes at a low value in response to an increase in the cooling target temperature T. As a result, it is also possible to keep the fan rotational speed FS low, and advantageous effects such as noise reduction, power consumption reduction, and the like can be achieved.

The fourth map M24 is configured to set the fan rotational speed FS to a sixth fan rotational speed FS25 that is higher than the fifth fan rotational speed FS24 when the cooling target temperature T increases to a fourth rotation increase temperature T26*a* higher than the first specified temperature T23 in a state where the fan rotational speed FS is set to the fifth fan rotational speed FS24, and to reduce the fan rotational speed FS to the fifth fan rotational speed FS24 when the cooling target temperature T decreases to a predetermined fourth rotation decrease temperature T26*b* that is lower than the fourth rotation increase temperature T26*a* and higher than the first specified temperature T23 in a state where the fan rotational speed FS is set to the sixth fan rotational speed FS25.

As a result, when the cooling target temperature T increases into a very high temperature range, including the fourth rotation increase temperature T26*a* and above, the rotational speed of the cooling fan immediately increases to the sixth fan rotational speed FS25, so that the cooling target can be quickly brought out of such a high temperature state. In addition, a situation in which the cooling target temperature T decreases as soon as the fan rotational speed FS increases to the sixth fan rotational speed FS25 and in which the fan rotational speed FS quickly decreases to the fifth fan rotational speed FS24 is avoided, and a sufficient and reliable cooling effect for the high-power equipment by the rotation of the cooling fan at the sixth fan rotational speed FS25 is ensured.

The cooler is a radiator 35 to cool cooling water that is used to cool equipment including the electric motor 9, and the cooling fan is a radiator fan 35*a* included in the radiator 35. The temperature detector 46 is configured to detect a temperature of the cooling water as the cooling target temperature T.

As a result, regarding the radiator fan 35*a* of the radiator 35 for cooling the cooling water, which is used to cool equipment including the electric motor 9 and/or the like, by taking advantage of the fact that it is an electric fan, the characteristic of the fan rotational speed FS of the radiator fan 35*a* with respect to the cooling water temperature T, which is the target of control, can be optimized depending on whether the situation is during loading, during unloading, or the like. Therefore, for example, during unloading, the rotation of the radiator fan 35*a* is stopped, or the radiator fan 35*a* is caused to rotate at the first fan rotational speed FS11 (at a low speed), so that advantageous effect(s) such as a reduction in noise generated by the high-speed rotation of the radiator fan 35*a*, a reduction in power consumption, prevention of excessive cooling, and/or the like can be obtained.

By controlling the rotational speed of the radiator fan 35*a* based on the abnormally high temperature detected by the abnormally-high-temperature detector 49, even in a state where the rotational speed of the radiator fan 35*a* is controlled in accordance with the temperature condition during loading, if an abnormally high temperature of the cooling target equipment, which is high-power equipment such as the electric motor 9, is detected, the radiator fan 35*a* can rotate at the third fan rotational speed FS13, which is higher than the second fan rotational speed FS12, allowing the cooling water which is the refrigerant to be quickly and strongly cooled in order to prioritize the cooling of the cooling target equipment, thereby preventing a failure of the cooling target equipment including the electric motor 9.

The working machine 1 further includes a hydraulic pump P1, P2 to be driven by the electric motor 9 and a hydraulic actuator C1 to C5, ML, MR, MT to be driven by a hydraulic pressure of a hydraulic fluid discharged by the hydraulic pump P1, P2. The cooler is an oil cooler 37 to cool the hydraulic fluid, and the cooling fan is an oil cooler fan 37*a* included in the oil cooler 37. The temperature detector 47 is configured to detect a temperature of the hydraulic fluid as the cooling target temperature T.

As a result, regarding the oil cooler fan 37*a* of the oil cooler 37 for cooling the hydraulic fluid, which is discharged from the hydraulic pump P1, P2 and supplied to the hydraulic actuator C1 to C5, ML, MR, MT, by taking advantage of the fact that it is an electric fan, the characteristic of the fan rotational speed FS of the oil cooler fan 37*a* with respect to the hydraulic fluid temperature T, which is the target of control, can be optimized depending on whether the situation is during loading, during unloading, or the like. Therefore, for example, during unloading, the rotation of the oil cooler fan 37*a* is stopped, or the oil cooler fan 37*a* is caused to rotate at the first fan rotational speed FS11 (at a low speed), so that advantageous effect(s) such as a reduction in noise generated by the high-speed rotation of the oil cooler fan 37*a*, a reduction in power consumption, prevention of excessive cooling, and/or the like can be obtained.

By selecting one of the second map M23 and the fourth map M24 in accordance with the setting of the rotational speed MS of the electric motor 9 and controlling the rotational speed of the oil cooler fan 37*a*, it is possible to exhibit a rotation characteristic of the oil cooler fan 37*a* that is appropriate for the temperature condition of the hydraulic fluid and that is exhibited by the motor rotation at each motor rotational speed. In other words, the fourth map M24 employs, in accordance with the temperature condition of the cooling target during motor rotation at the low rotational speed MS2, a rotation characteristic in which the fan rotational speed FS changes at a low value in response to an increase in the cooling target temperature T. As a result, it is also possible to keep the fan rotational speed FS low, and advantageous effect(s) such as noise reduction, power consumption reduction, and/or the like can be achieved.

The working machine 1 includes the hydraulic pump P1, P2 to be driven by the electric motor 9, and a hydraulic actuator C1 to C5, ML, MR, MT, to be driven by a hydraulic pressure of a hydraulic fluid discharged by the hydraulic pump P1, P2. The working machine 1 includes a radiator 35 to cool cooling water that is used to cool equipment including the electric motor 9 and an oil cooler 37 to cool the hydraulic fluid, the radiator 35 and the oil cooler 37 each serving as the cooler, and includes a radiator fan 35*a* included in the radiator 35 and an oil cooler fan 37*a* included in the oil cooler 37, the radiator fan 35*a* and the oil cooler fan 37*a* each serving as the cooling fan. The temperature detector (water temperature detector 46, fluid temperature detector 47) is configured to detect a temperature of the cooling water and a temperature of the hydraulic fluid, each as the cooling target temperature T. The memory (the storage unit 7*b*) is configured to store a plurality of fan control maps M11, M12, and M13 for the radiator fan 35*a* indicating a characteristic of a rotational speed FS of the radiator fan 35*a* with respect to the temperature T of the cooling water and a plurality of fan control maps M21, M22, M23, and M24 for the oil cooler fan 37*a* indicating a characteristic of a rotational speed FS of the oil cooler fan 37*a* with respect to the temperature T of the hydraulic fluid. The controller 7 is configured or programmed to control the rotational speed FS of the radiator fan 35*a* based on the plurality of fan control maps M11, M12, and M13 for the radiator fan 35*a* and controls the rotational speed FS of the oil cooler fan 37*a* based on the plurality of fan control maps M21, M22, M23, and M24 for the oil cooler fan 37*a*.

As a result, in the working machine 1 including the two cooling fans, which are the radiator fan 35*a* and the oil cooler fan 37*a*, optimal rotational control according to the function of each of the cooling fans and each expected temperature condition can be achieved. In particular, in the structure in which these two cooling fans are arranged side by side, the problem of noise is more serious compared with the case of providing a single cooling fan, and a reliable noise reduction effect can be provided for such a structure.

In the above example embodiment, a case has been described in which the present invention is applied to the working machine 1, such as a backhoe or the like. However, the target to which the present invention is to be applied is not limited to this, and for example, the present invention may be applied to any other construction machine such as a wheel loader, a compact track loader, a skid-steer loader, or the like or may be applied to an agricultural machine such as a tractor, a combine, a rice transplanter, a lawn mower, or the like.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

an electric motor;

a working device to be driven by power of the electric motor;

an operation device including an operation lever, a switch, or a dial to operate the working device;

an operation locker switchable between an enabling position where an operation of the working device by the operation device is enabled and a disabling position where the operation of the working device by the operating device is disabled;

a cooler including an electric cooling fan;

a temperature sensor to detect a cooling target temperature that is a temperature of a cooling target to be cooled by the cooler; and a controller to control a fan rotational speed that is a rotational speed of the cooling fan in accordance with the cooling target temperature detected by the temperature sensor, wherein the controller is configured or programmed to change a characteristic of the fan rotational speed with respect to the cooling target temperature depending on whether the operation locker is in the enabling position or in the disabling position, the working machine further comprises a memory to store a plurality of fan control maps each indicating the characteristic of the fan rotational speed with respect to the cooling target temperature, wherein the plurality of fan control maps include a first map and a second map that are different from each other, and the controller is configured or programmed to control rotational driving of the cooling fan based on the first map when the operation locker is in the disabling position, and to control the rotational driving of the cooling fan based on the second map when the operation locker is in the enabling position.

2. The working machine according to claim 1, wherein the first map is configured to switch the fan rotational speed between zero and a predetermined first fan rotational speed in accordance with the cooling target temperature.

3. The working machine according to claim 2, wherein the first map is configured to switch the fan rotational speed to the first fan rotational speed when the cooling target temperature increases from a temperature lower than a predetermined first rotation increase temperature to the first rotation increase temperature in a state where the fan rotational speed is zero, and to switch the fan rotational speed to zero when the cooling target temperature decreases to a predetermined first rotation decrease temperature lower than the first rotation increase temperature in a state where the fan rotational speed is set to the first fan rotational speed.

4. The working machine according to claim 1, wherein the second map is configured to set the fan rotational speed to a value greater than zero when the cooling target temperature increases from a temperature lower than a predetermined second rotation increase temperature to the second rotation increase temperature in a state where the fan rotational speed is zero, set the fan rotational speed to a predetermined second fan rotational speed when the cooling target temperature is equal to or higher than a first specified temperature that is set to be higher than the second rotation increase temperature, set the fan rotational speed to become higher, within a range below the second fan rotational speed, as the cooling target temperature increases when the cooling target temperature is equal to or higher than the second rotation increase temperature and lower than the first specified temperature, and reduce the fan rotational speed to zero when the cooling target temperature decreases to a predetermined second rotation decrease temperature lower than the second rotation increase temperature in a state where the fan rotational speed is not zero.

5. The working machine according to claim 4, wherein the second map is configured to set the fan rotational speed to a fixed value less than the second fan rotational speed when the cooling target temperature is lower than a second specified temperature that is set to be equal to or higher than the second rotation increase temperature and to be lower than the first specified temperature, and set the fan rotational speed to become higher, within a range below the second fan rotational speed, as the cooling target temperature increases when the cooling target temperature is equal to or higher than the second specified temperature and lower than the first specified temperature.

6. The working machine according to claim 1, wherein the plurality of fan control maps include a third map, the controller is configured or programmed to set a rotational speed of the electric motor to an idle speed, and control the cooling fan based on the third map when the operation locker is in the enabling position and the operation device is not operated for a certain period of time, and the third map is configured to switch the fan rotational speed to a predetermined auto-idle speed when the cooling target temperature increases from a temperature lower than a predetermined third rotation increase temperature to the third rotation increase temperature in a state where the fan rotational speed is zero, and to switch the fan rotational speed to zero when the cooling target temperature decreases to a predetermined third rotation decrease temperature lower than the third rotation increase temperature in a state where the fan rotational speed is set to the auto-idle speed.

7. The working machine according to claim 6, wherein the third map is common with the first map.

8. The working machine according to claim 4, wherein the cooling target of the cooler is a refrigerant that is used to cool cooling target equipment included in the working machine, the working machine comprises an abnormally-high-temperature sensor to detect an abnormally high temperature of the cooling target equipment, and the controller is configured or programmed to cause the cooling fan to rotate at a third fan rotational speed higher than the second fan rotational speed when the abnormally-high-temperature sensor detects an abnormally high temperature and the cooling target temperature is equal to or higher than a third specified temperature that is set to be equal to or higher than the second rotation increase temperature.

9. The working machine according to claim 8, wherein the controller is configured or programmed to cause control of the rotational speed of the cooling fan to return to control based on the second map when the cooling target temperature decreases to a fourth specified temperature that is lower than the third specified temperature in a state where the cooling fan is rotating at the third fan rotational speed.

10. The working machine according to claim 4, wherein the second map is configured to set the fan rotational speed to a fourth fan rotational speed that is higher than the second fan rotational speed when the cooling target temperature increases to a fourth rotation increase temperature that is higher than the first specified temperature in a state where the fan rotational speed is set to the second fan rotational speed, and reduce the fan rotational speed to the second fan rotational speed when the cooling target temperature decreases to a predetermined fourth rotation decrease temperature that is lower than the fourth rotation increase temperature and higher than the first specified temperature in a state where the fan rotational speed is set to the fourth fan rotational speed.

11. The working machine according to claim 4, wherein the plurality of fan control maps include a fourth map, the fourth map is configured to set the fan rotational speed to a value greater than zero when the cooling target temperature increases from a temperature lower than the second rotation increase temperature to the second rotation increase temperature in a state where the fan rotational speed is zero, set the fan rotational speed to a predetermined fifth fan rotational speed that is lower than the second fan rotational speed when the cooling target temperature is equal to or higher than the first specified temperature, set the fan rotational speed to become higher, within a range below the fifth fan rotational speed, as the cooling target temperature increases when the cooling target temperature is equal to or higher than the second rotation increase temperature and lower than the first specified temperature, and reduce the fan rotational speed to zero when the cooling target temperature decreases to the second rotation decrease temperature in a state where the fan rotational speed is not zero, and the controller is configured or programmed to control the cooling fan based on the second map when a rotational speed of the electric motor is set to a high value, and to control the cooling fan based on the fourth map when the rotational speed of the electric motor is set to a low value.

12. The working machine according to claim 11, wherein the fourth map is configured to set the fan rotational speed to a sixth fan rotational speed that is higher than the fifth fan rotational speed when the cooling target temperature increases to a fourth rotation increase temperature that is higher than the first specified temperature in a state where the fan rotational speed is set to the fifth fan rotational speed, and reduce the fan rotational speed to the fifth fan rotational speed when the cooling target temperature decreases to a predetermined fourth rotation decrease temperature that is lower than the fourth rotation increase temperature and higher than the first specified temperature in a state where the fan rotational speed is set to the sixth fan rotational speed.

13. The working machine according to claim 1, wherein the cooler is a radiator to cool cooling water that is used to cool equipment including the electric motor, the cooling fan is a radiator fan included in the radiator, and the temperature sensor is configured to detect a temperature of the cooling water as the cooling target temperature.

14. The working machine according to claim 8, wherein the cooler is a radiator to cool cooling water that is used to cool equipment including the electric motor, the cooling fan is a radiator fan included in the radiator, and the temperature sensor is configured to detect a temperature of the cooling water as the cooling target temperature.

15. The working machine according to claim 1, further comprising:

a hydraulic pump to be driven by the electric motor; and a hydraulic actuator to be driven by a hydraulic pressure of a hydraulic fluid discharged by the hydraulic pump, wherein the cooler is an oil cooler to cool the hydraulic fluid, and the cooling fan is an oil cooler fan included in the oil cooler, and the temperature sensor is configured to detect a temperature of the hydraulic fluid as the cooling target temperature.

16. The working machine according to claim 11, further comprising:

a hydraulic pump to be driven by the electric motor; and a hydraulic actuator to be driven by a hydraulic pressure of a hydraulic fluid discharged by the hydraulic pump, wherein the cooler is an oil cooler to cool the hydraulic fluid, and the cooling fan is an oil cooler fan included in the oil cooler, and the temperature sensor is configured to detect a temperature of the hydraulic fluid as the cooling target temperature.

17. The working machine according to claim 1, further comprising:

a hydraulic pump to be driven by the electric motor;

a hydraulic actuator to be driven by a hydraulic pressure of a hydraulic fluid discharged by the hydraulic pump;

a radiator to cool cooling water that is used to cool equipment including the electric motor and an oil cooler to cool the hydraulic fluid, the radiator and the oil cooler each serving as the cooler; and a radiator fan included in the radiator and an oil cooler fan included in the oil cooler, the radiator fan and the oil cooler fan each serving as the cooling fan, wherein the temperature sensor is configured to detect a temperature of the cooling water and a temperature of the hydraulic fluid, each as the cooling target temperature, the memory is configured to store a plurality of fan control maps for the radiator fan each indicating a characteristic of a rotational speed of the radiator fan with respect to the temperature of the cooling water and a plurality of fan control maps for the oil cooler fan each indicating a characteristic of a rotational speed of the oil cooler fan with respect to the temperature of the hydraulic fluid, and the controller is configured or programmed to control the rotational speed of the radiator fan based on the plurality of fan control maps for the radiator fan, and control the rotational speed of the oil cooler fan based on the plurality of fan control maps for the oil cooler fan.

* * * * *